United States Patent
Jin et al.

(10) Patent No.: US 10,477,238 B2
(45) Date of Patent: Nov. 12, 2019

(54) SUB-PU BASED BI-DIRECTIONAL MOTION COMPENSATION IN VIDEO CODING

(71) Applicant: QUALCOMM Incorporated, San Diego, CA (US)

(72) Inventors: Guoxin Jin, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 15/696,727

(22) Filed: Sep. 6, 2017

(65) Prior Publication Data
US 2018/0070105 A1    Mar. 8, 2018

Related U.S. Application Data

(60) Provisional application No. 62/384,509, filed on Sep. 7, 2016.

(51) Int. Cl.
*H04N 7/12*    (2006.01)
*H04N 11/02*   (2006.01)
(Continued)

(52) U.S. Cl.
CPC ......... *H04N 19/577* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

2014/0086329 A1*  3/2014  Seregin .................. H04N 19/56
                                                    375/240.16
2015/0085929 A1   3/2015  Chen et al.
                          (Continued)

FOREIGN PATENT DOCUMENTS

WO     2016078511 A1    5/2016

OTHER PUBLICATIONS

International Search Report and Written Opinion—PCT/US2017/050502—ISA/EPO—Jan. 10, 2018 (20 pp).
(Continued)

*Primary Examiner* — Talha M Nawaz
(74) *Attorney, Agent, or Firm* — Shumaker & Sieffert, P.A.

(57) ABSTRACT

Techniques are described in which a video decoder is configured to partition, into a plurality of sub-blocks, a block of a picture of the video data. The video decoder is further configured to, for each respective sub-block of the plurality of sub-blocks, derive a respective first motion vector of the respective sub-block based on motion information for at least two blocks neighboring the respective sub-block. The video decoder also determines, based on a respective motion vector difference for the respective sub-block signaled in a bitstream, a second motion vector for the respective sub-block. Additionally, the video decoder generates, based on the first motion vector of the respective sub-block and the second motion vector of the respective sub-block, a predictive block for the respective sub-block.

26 Claims, 17 Drawing Sheets

(51) Int. Cl.

| | | |
|---|---|---|
| *H04N 11/04* | (2006.01) | |
| *H04N 19/577* | (2014.01) | |
| *H04N 19/513* | (2014.01) | |
| *H04N 19/537* | (2014.01) | |
| *H04N 19/18* | (2014.01) | |
| *H04N 19/172* | (2014.01) | |
| *H04N 19/139* | (2014.01) | |
| *H04N 19/159* | (2014.01) | |
| *H04N 19/105* | (2014.01) | |

(52) U.S. Cl.
CPC ......... *H04N 19/159* (2014.11); *H04N 19/172* (2014.11); *H04N 19/18* (2014.11); *H04N 19/521* (2014.11); *H04N 19/537* (2014.11)

(56) References Cited

U.S. PATENT DOCUMENTS

| | | | |
|---|---|---|---|
| 2015/0264351 A1* | 9/2015 | Miyoshi | H04N 19/107 375/240.13 |
| 2016/0021927 A1 | 1/2016 | Kondo | |
| 2016/0219278 A1 | 7/2016 | Chen et al. | |
| 2016/0366435 A1 | 12/2016 | Chien et al. | |

OTHER PUBLICATIONS

Xiang Li et al., "Report of AHG3 on JEM Software Development," Joint Video Exploration Team (JVET) of ITU-T SG 16 WP 3 and ISO/IEC JTC 1/SC 29/WG 11—8th Meeting: Macao, CN, Oct. 18-25, 2017—JVET—H0003_r1 (3 pp).
Xiang Li et al., "Report of AHG on JEM Software Development," Joint Video Exploration Team (JVET) of ITU-T SG 16 WP 3 and ISO/IEC JTC 1/SC 29/WG 11—2nd Meeting: San Diego, USA, Feb. 20-26, 2016—JVET—B0006 (4 pp).
Reply to Written Opinion from corresponding PCT Application Serial No. PCT/US2017/050502 filed on Jun. 25, 2018 (34 pp).
Second Written Opinion from corresponding PCT Application Serial No. PCT/US2017/050502 dated Jul. 20, 2018 (8 pp).
Chen et al., "Algorithm description of Joint Exploration Test Model 3 (JEM3)", JVET Meeting; May 26-Jun. 1, 2016; Geneva; The Joint Video Exploration Team Of ISO/IEC JTC1/SC29/WG11 and ITU-T SG.16; No. JVET-C1001, Jul. 2, 2016, XP030150223, 35 pp.
Invitation to Restrict or Pay Additional Fees from International Application No. PCT/US2017/050502, dated Nov. 16, 2017, 17 pp.
Sullivan, et al., "Overview of the High Efficiency Video Coding (HEVC) Standard", IEEE Transactions On Circuits And Systems For Video Technology, vol. 22, No. 12, Dec. 1, 2012, XP55388661, USA ISSN: 1051-8215, DOI: 10.1109/TCSVT.2012.2221191, pp. 1649-1668, 20 pp.
ITU-T H.261, Line Transmission of Non-Telephone Signals, Video Codec for Audiovisual Services At p x 64 kbits, The International Telecommunication Union, Mar. 1993, 29 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 263 pp.
Tech, et al., "MV-HEVC Draft Text 5", Jul. 27-Aug. 2, 2013; Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Aug. 7, 2013, 65 pp.
Tech et al., "3D-HEVC Draft Text 1," Joint Collaborative Team on 3D Video Coding Extension Development of ITU-T SG 16 WP 3 AND ISO/IEC JTC 1/SC 29/WG 11, Jul. 27-Aug. 2, 2013, Document: JCT3V-E1001-v3, Sep. 11, 2013, 89 pp.
Wiegand T., et al.,"Overview of the H.264/AVC Video Coding Standard," IEEE Transactions on Circuits and Systems for Video Technology, IEEE Service Center, Piscataway, NJ, US, vol. 13, No. 7, Jul. 1, 2003, pp. 560-576, 17 pp.
Tech et al., "3D-HEVC Draft Text 7," Joint Collaborative Team on 3D Video Coding Extensions of ITU-T SG 16 WP 3 and ISO/IEC JTC 1/SC 29/WG 11, Feb. 12-18, 2015, Document: JCT3V-K1001-v7, 113 pp.
Liu H., et al., "Multiple Hypotheses Bayesian Frame Rate Up-Conversion by Adaptive Fusion of Motion-Compensated Interpolations", IEEE transactions on circuits and systems for video technology, Aug. 2012, vol. 22, No. 8, pp. 1188-1198.
Lee, et al., "Frame Rate Up Conversion Based on Variational Image Fusion", IEEE Transactions on image processing, Jan. 2014, vol. 23, No. 1, pp. 399-412.
Kim et al., "New Frame Rate Up-Conversion Algorithms With Low Computational Complexity", IEEE Transactions on circuits and systems for video technology, Mar. 2014, vol. 24, No. 3, pp. 384-393.
Kamp, et al., "Decoder-Side Motion Vector Derivation for Block-Based Video Coding", IEEE transactions on circuits and systems for video technology, vol. 22, No. 12, Dec. 2012, pp. 1732-1745.
Chiu, et al., "Decoder-side Motion Estimation and Wiener filter for HEVC", 2013 Visual Communications and Image Processing (VCIP), IEEE, Nov. 17, 2013; XP032543658, DOI: 10.1109/VCIP.2013.6706446 [retrieved on Jan. 8, 2014], 6 pp.
Liu, et al., "A Block-Based Gradient Descent Search Algorithm for Block Motion Estimation in Video Coding", IEEE Transactions Circuits and Systems for Video Technology, Aug. 1996, vol. 6, No. 4, pp. 419-422.
Tham, et al., "A Novel Unrestricted Center-Biased Diamond Search Algorithm for Block Motion Estimation," IEEE Transactions on Circuits and Systems for Video Technology, Aug. 1998, vol. 8, No. 4, pp. 369-377.
Zhu, et al., "Hexagon-Based Search Pattern for Fast Block Motion Estimation", IEEE Transactions on Circuits and Systems Video Technology, May 2002, vol. 12, No. 5, pp. 349-355.
ITU-T H.264, Series H: Audiovisual and Multimedia Systems, Infrastructure of audiovisual services—Coding of moving video, Advanced video coding for generic audiovisual services, Mar. 2010, 674 pp.
International Preliminary Report on Patentability from corresponding PCT Application Serial No. PCT/US2017/050502 dated Nov. 12, 2018 (35 pp).

\* cited by examiner

SUB-PU BASED BI-DIRECTIONAL MOTION COMPENSATION IN VIDEO CODING

RELATED APPLICATIONS

This application claims the benefit of U.S. Provisional Application No. 62/384,509, filed Sep. 7, 2016, the entirety of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to motion vector prediction in video codecs. More specifically, bi-directional motion vectors are derived in a sub-block (sub-PU) level for a given block (prediction unit) from spatial and temporal neighboring blocks.

In an example, the disclosure describes a method of decoding video data including partitioning, into a plurality of sub-blocks, a block of a picture of the video data. The method further includes, for each respective sub-block of the plurality of sub-blocks, deriving a respective first motion vector of the respective sub-block based on motion information for at least two blocks neighboring the respective sub-block. The method further includes determining, based on a respective motion vector difference for the respective sub-block signaled in a bitstream, a second motion vector for the respective sub-block. The method further includes generating, based on the first motion vector of the respective sub-block and the second motion vector of the respective sub-block, a predictive block for the respective sub-block.

In an example, the disclosure describes a method of encoding video data including partitioning, into a plurality of sub-blocks, a block of a picture of the video data. The method further includes, for each respective sub-block of the plurality of sub-blocks, deriving a respective first motion vector of the respective sub-block based on motion information for at least two blocks neighboring the respective sub-block. The method further includes determining, based on a coding block for the respective sub-block, a second motion vector for the respective sub-block that corresponds to a motion vector for a reference picture for the respective sub-block. The method further includes determining, based on a difference between the coding block for the respective sub-block and the second motion vector of the respective sub-block, a respective motion vector difference for the respective sub-block. The method further includes signaling the respective motion vector difference for the respective sub-block in a bitstream. The method further includes generating, based on the first motion vector of the respective sub-block and the second motion vector of the respective sub-block, a predictive block for the respective sub-block.

In an example, the disclosure describes an apparatus for decoding video data including one or more storage media configured to store video data and one or more processors. The one or more processors are configured to partition, into a plurality of sub-blocks, a block of a picture of the video data. The one or more processors are configured to, for each respective sub-block of the plurality of sub-blocks, derive a respective first motion vector of the respective sub-block based on motion information for at least two blocks neighboring the respective sub-block. The one or more processors are configured to determine, based on a respective motion vector difference for the respective sub-block signaled in a bitstream, a second motion vector for the respective sub-block. The one or more processors are configured to generate, based on the first motion vector of the respective sub-block and the second motion vector of the respective sub-block, a predictive block for the respective sub-block.

In an example, the disclosure describes an apparatus for encoding video data including one or more storage media configured to store video data and one or more processors. The one or more processors are configured to partition, into a plurality of sub-blocks, a block of a picture of the video data. The one or more processors are configured to, for each respective sub-block of the plurality of sub-blocks, derive a respective first motion vector of the respective sub-block based on motion information for at least two blocks neighboring the respective sub-block. The one or more processors are configured to determine, based on a coding block for the respective sub-block, a second motion vector for the respective sub-block that corresponds to a motion vector for a reference picture for the respective sub-block. The one or more processors are configured to determine, based on a difference between the coding block for the respective sub-block and the second motion vector of the respective sub-block, a respective motion vector difference for the respective sub-block. The one or more processors are configured to signal the respective motion vector difference for the respective sub-block in a bitstream. The one or more processors are configured to generate, based on the first motion vector of the respective sub-block and the second motion vector of the respective sub-block, a predictive block for the respective sub-block.

In an example, the disclosure describes a non-transitory computer-readable storage medium storing instructions that, when executed, cause one or more processors of a device for decoding video data to partition, into a plurality of sub-blocks, a block of a picture of the video data. The instructions further cause the one or more processors to, for each respective sub-block of the plurality of sub-blocks, derive a respective first motion vector of the respective sub-block based on motion information for at least two blocks neighboring the respective sub-block. The instructions further cause the one or more processors to determine, based on a respective motion vector difference for the respective sub-block signaled in a bitstream, a second motion vector for the respective sub-block. The instructions further cause the one or more processors to generate, based on the first motion vector of the respective sub-block and the second motion vector of the respective sub-block, a predictive block for the respective sub-block.

In an example, the disclosure describes a non-transitory computer-readable storage medium storing instructions that, when executed, cause one or more processors of a device for encoding video data to partition, into a plurality of sub-blocks, a block of a picture of the video data. The instructions further cause the one or more processors to, for each respective sub-block of the plurality of sub-blocks, derive a respective first motion vector of the respective sub-block based on motion information for at least two blocks neighboring the respective sub-block. The instructions further cause the one or more processors to determine, based on a coding block for the respective sub-block, a second motion vector for the respective sub-block that corresponds to a motion vector for a reference picture for the respective sub-block. The instructions further cause the one or more processors to determine, based on a difference between the coding block for the respective sub-block and the second motion vector of the respective sub-block, a respective motion vector difference for the respective sub-block. The instructions further cause the one or more processors to signal the respective motion vector difference for the respective sub-block in a bitstream. The instructions further cause the one or more processors to generate, based on the first motion vector of the respective sub-block and the second motion vector of the respective sub-block, a predictive block for the respective sub-block.

In an example, the disclosure describes an apparatus for decoding video data including means for partitioning, into a plurality of sub-blocks, a block of a picture of the video data. The apparatus further includes, for each respective sub-block of the plurality of sub-blocks, means for deriving a respective first motion vector of the respective sub-block based on motion information for at least two blocks neighboring the respective sub-block. The apparatus further includes means for determining, based on a respective motion vector difference for the respective sub-block signaled in a bitstream, a second motion vector for the respective sub-block. The apparatus further includes means for generating, based on the first motion vector of the respective sub-block and the second motion vector of the respective sub-block, a predictive block for the respective sub-block.

In an example, the disclosure describes an apparatus for encoding video data including means for partitioning, into a plurality of sub-blocks, a block of a picture of the video data. The apparatus further includes, for each respective sub-block of the plurality of sub-blocks, means for deriving a respective first motion vector of the respective sub-block based on motion information for at least two blocks neighboring the respective sub-block. The apparatus further includes means for determining, based on a coding block for the respective sub-block, a second motion vector for the respective sub-block that corresponds to a motion vector for a reference picture for the respective sub-block. The apparatus further includes means for determining, based on a difference between the coding block for the respective sub-block and the second motion vector of the respective sub-block, a respective motion vector difference for the respective sub-block. The apparatus further includes means for signaling the respective motion vector difference for the respective sub-block in a bitstream. The apparatus further includes means for generating, based on the first motion vector of the respective sub-block and the second motion vector of the respective sub-block, a predictive block for the respective sub-block.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
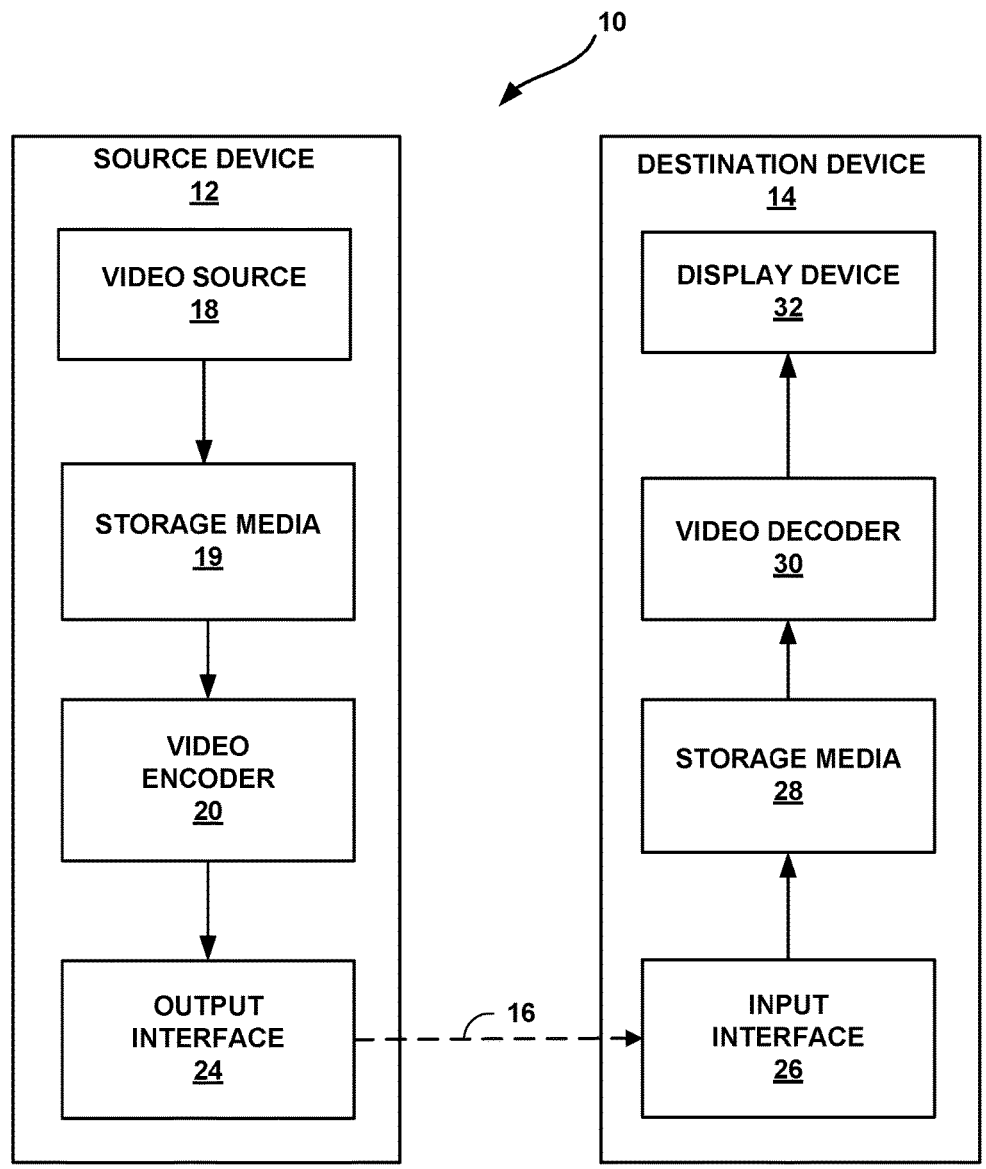
FIG. 1 is a block diagram illustrating an example video encoding and decoding system that may utilize one or more techniques described in this disclosure.

In general, this disclosure describes techniques related to motion vector prediction in video coding. Motion information may include a motion vector that includes a horizontal component and a vertical component, with each indicating an offset value along the horizontal and vertical direction respectively. Motion information may be used in the context of advanced video codecs, such as extensions of HEVC or the next generation of video coding standards, A video coder (e.g., a video decoder, video encoder, etc.) may perform forward and/or backward motion prediction for a given picture of slice. For example, a block of the picture or slice may be forward predicted based on a reference list '0' (e.g., "RefPicList0"). Additionally, or alternatively, the block of the picture or slice may be backward predicted based on a reference list '1' (e.g., "RefPicList1"). In some systems, a video coder may perform bi-direction prediction using both forward and backward prediction.

Some video coders using bi-directional prediction may reuse spatial and temporal neighboring motion vectors by assuming that motion within a picture or slice are highly correlated, which may reduce a motion accuracy in a resulting predicted block. Some video coders may perform bi-directional motion compensation using two sets of motion vectors. Some video coders performing bi-directional motion compensation may signal reference indexes (e.g., "RefIdx") for each motion vector in a bitstream. However, a cost of signaling the extra motion vector may be significant compared to uni-directional motion compensation techniques, if the value of motion vector differences (MVD) are large.

It is desirable to reduce an amount of data signaled for reconstructing a coding block for generating a picture of a video. For example, a video encoder may signal relatively accurate motion vectors that minimize an amount of residual data signaled in a bitstream. However, such video systems may signal the motion vectors using a relatively high amount of data in the bitstream. In other examples, a video decoder may predict motion vectors to reduce an amount of data in the bitstream used for signaling the motion vectors. However, in such video systems, the predicted motion vectors may have a relatively low motion accuracy in a resulting predicted block, thereby resulting in relatively large residual data. As such, problems may exist in video coders for generating motion vectors that minimize an amount of data signaled for motion vector prediction while maximizing a motion accuracy in a resulting predicted block.

In accordance with one or more techniques described herein, a video encoder may derive a first motion vector from one direction (e.g., "RefPicList0") and may signal a second motion vector in the other direction (e.g., "RefPicList1") to improve accuracy while reducing a cost for signaling motion vectors. For example, the video encoder may select a direction and picture for the first motion vector to improve a motion accuracy in a resulting predicted block. Additionally, because a video decoder may derive the first motion vector, the video encoder may signal less data in the bitstream than bi-directional motion compensation using two sets of signaled motion vectors. In this way, one or more techniques described herein, reduce an amount of data signaled for reconstructing a coding block for generating a picture of a video compared to video systems performing bi-directional motion compensation and video systems performing bi-directional motion compensation that signal reference indexes (e.g., "RefIdx") for each motion vector in the bitstream.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In sonic examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions. Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may encode blocks of a picture of the video data. Video encoder 20 may include, in a bitstream, an encoded representation of the video block. For example, in HEVC, to generate an encoded representation of a picture, video encoder 20 may generate a set of coding tree units (CTUs). Each of the CTUs may comprise one or more coding tree blocks (CTBs) and may comprise syntax structures used to code the samples of the one or more coding tree blocks. For instance, each a CTU may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). A syntax structure may be defined as zero or more syntax elements present together in the bitstream in a specified order. The size of a CTB can range from 16×16 to 64×64 in the HEVC main profile (although technically 8×8 CTB sizes can be supported).

In HEVC, a slice includes an integer number of CTUs ordered consecutively in a raster scan order. Thus, in HEVC, the largest coding unit in a slice is called a coding tree block (CTB).

In HEVC, to generate a coded CTU of a picture, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise one or more coding blocks and syntax structures used to code samples of the one or more coding blocks. For example, a CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. Thus, a CTB may contain a quad-tree, the nodes of which are CUs.

Furthermore, video encoder 20 may encode a CU. For instance, to encode a CU, video encoder 20 may partition a coding block of a CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

In HEVC, each CU is coded with one mode, which could be either intra mode or inter mode. When a CU is inter coded (i.e., inter mode is applied), the CU may be further partitioned into 2 or 4 PUs or become just one PU when further partitioning does not apply. When two PUs are present in one CU, the two PUs can be half size rectangles or two rectangle sizes with ¼ or ¾ size of the CU. There are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N, as shown in FIG. 3.

When the CU is inter coded, one set of motion information is present for each PU. In addition, each PU is coded with a unique inter-prediction mode to derive the set of motion information. If video encoder 20 uses intra prediction to generate the predictive blocks of a PU, video encoder 20 may generate the predictive blocks of the PU based on decoded samples of the picture that includes the PU. When a CU is intra coded, 2N×2N and N×N are the only permissible PU shapes, and within each PU a single intra prediction mode is coded (while chroma prediction mode is signalled at CU level). The N×N intra PU shapes are only allowed when the current CU size is equal to the smallest CU size defined in a sequence parameter set (SPS).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes encoded video data. For example, the bitstream may comprise a sequence of bits that forms a representation of coded pictures of the video data and associated data. Thus, the bitstream comprises an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In this section video coding standards, especially motion vector prediction related techniques of previous standards are described.

Existing video coding standards are discussed in the following. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, Mar. 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end_user/documents/12_Geneva/wg11/JCTVC-L1003-v34.zip.

Motion information is discussed in the following. For each block, a set of motion information can be available. The set of motion information may contain motion information for forward and backward prediction directions. Here, forward and backward prediction directions may be two prediction directions corresponding to reference picture list 0 (RefPicList0) and reference picture list 1 (RefPicList1) of a current picture or slice. The terms "forward" and "backward" do not necessarily have a geometric meaning Instead, they are used to distinguish which reference picture list a motion vector is based on. Forward prediction may refer to a prediction formed based on reference list 0, while backward prediction may refer to a prediction formed based on reference list 1. Bi-directional prediction may refer to prediction based on both reference list 0 and reference list 1.

For a given picture or slice, if only one reference picture list is used, every block inside the picture or slice may be forward predicted. If both reference picture lists are used for a given picture or slice, a block inside the picture or slice may be forward predicted, or backward predicted, or bi-directionally predicted.

For each prediction direction, the motion information may contain a reference index and a motion vector. A reference index may be used to identify a reference picture in the corresponding reference picture list (e.g. RefPicList0 or RefPicList1). A motion vector may have both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

Picture order count (POC) is discussed in the following. POC is widely used in video coding standards to identify a display order of a picture. Although there may be cases where two pictures within one coded video sequence may have the same POC value, it typically does not happen within a coded video sequence. When multiple coded video sequences are present in a bitstream, pictures with a same value of POC may be closer to each other in terms of decoding order.

POC values of pictures may be typically used for a reference picture list construction and/or a derivation of a reference picture set as in HEVC and motion vector scaling.

Advanced video coding (AVC) is discussed in the following. AVC is described in Wiegand, Thomas; Sullivan, Gary J.; Bjøntegaard, Gisle; Luthra, Ajay (July 2003). "Overview of the H.264/AVC Video Coding Standard" (PDF). IEEE Transactions on Circuits and Systems for Video Technology 13 (7). Macroblock (MB) structure in AVC is discussed in the following. In H.264/AVC, each inter MB may be partitioned into four different ways. A first partitioning of a MB in H.264/AVC, may include one 16×16 MB partition. A second partitioning of a MB in H.264/AVC, may include two 16×8 MB partitions. A third partitioning of a MB in H.264/AVC, may include two 8×16 MB partitions. A fourth partitioning of a MB in H.264/AVC, may include four 8×8 MB partitions.

Different MB partitions in one MB may have different reference index values for each direction (RefPicList0 or RefPicList1).

When an MB is not partitioned into four 8×8 MB partitions, the MB may have only one motion vector for each MB partition in each direction.

When an MB is partitioned into four 8×8 MB partitions, each 8×8 MB partition may be further partitioned into sub-blocks, each of which can have a different motion vector in each direction. There may be four different ways to get sub-blocks from an 8×8 MB partition. A first way to get sub-blocks from an 8×8 MB partition, may include one 8×8 sub-block. A second way to get sub-blocks from an 8×8 MB partition, may include two 8×4 sub-blocks. A third way to get sub-blocks from an 8×8 MB partition, may include two 4×8 sub-blocks. A fourth way to get sub-blocks from an 8×8 MB partition, may include four 4×4 sub-blocks. Said differently, video decoder 30 may partition, into a plurality of sub-blocks, a block of a picture of the video data. Similarly, video encoder 20 may partition, into a plurality of sub-blocks, a block of a picture of the video data.

Each sub-block may have a different motion vector in each direction. Therefore, a motion vector may be present in a level equal to or higher than a sub-block.

A temporal direct mode in AVC is discussed in the following. In AVC, temporal direct mode may be enabled in either a MB or a MB partition level for skip or direct mode in B slices. For each MB partition, the motion vectors of the block co-located with the current MB partition in the RefPicList1[0] of the current block may be used to derive the motion vectors. Each motion vector in the co-located block may be scaled based on POC distances.

Spatial direct mode in AVC is discussed in the following. In AVC, a direct mode can also predict motion information from the spatial neighbors.

HEVC is discussed in the following. HEVC nay be described further in G. J. Sullivan; J.-R. Ohm; W.-J. Han; T. Wiegand (December 2012). "Overview of the High Efficiency Video Coding (HEVC) Standard" (PDF). IEEE Transactions on Circuits and Systems for Video Technology (IEEE) 22 (12). A coding unit (CU) structure in HEVC is discussed in the following. In HEVC, the largest coding unit in a slice may be called a coding tree block (CTB) or coding tree unit (CTU). A CTB may contain a quad-tree the nodes of which are coding units.

The size of a CTB may be ranges from 16×16 to 64×64 in the HEVC main profile (although technically 8×8 CTB sizes may be supported). A CU may be the same size of a CTB although and as small as 8×8. Each coding unit may be coded with one mode. When a CU is inter coded, the CU may be further partitioned into 2 or 4 prediction units (PUs) or become just one PU when further partition doesn't apply. When two PUs are present in one CU, they may be half size rectangles or two rectangle size with ¼ or ¾ size of the CU.

When the CU is inter coded, one set of motion information may be present for each PU. In addition, each PU may be coded with a unique inter-prediction mode to derive the set of motion information.

Motion vector prediction is discussed in the following. In the HEVC standard, there may be two inter prediction modes, named merge (e.g., skip may be considered as a special case of merge) and advanced motion vector prediction (AMVP) modes respectively for a PU.

In either AMVP or merge mode, a motion vector (MV) candidate list may be maintained for multiple motion vector predictors. The motion vector(s), as well as reference indices in the merge mode, of the current PU may be generated by taking one candidate from the MV candidate list.

The MV candidate list may contain up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures may be used for a prediction of current blocks, as well as associated motion vectors may be determined. However, under AMVP mode for each potential prediction direction from either list 0 or list 1, a reference index may be explicitly signaled, together with an MVP index to the MV candidate list because the AMVP candidate may contain only a motion vector. In AMVP mode, the predicted motion vectors may be further refined.

As can be seen above, a merge candidate may correspond to a full set of motion information, while an AMVP candidate may contain just one motion vector for a specific prediction direction and reference index.

The candidates for both modes may be derived similarly from the same spatial and temporal neighboring blocks.

Spatial neighboring candidates is discussed in the following. Spatial MV candidates may be derived from the neighboring blocks shown on FIGS. 2A and 2B, for a specific PU ($PU_0$). In some examples, the techniques for generating the candidates from the blocks may differ for merge and AMVP modes.

Figure 2B:
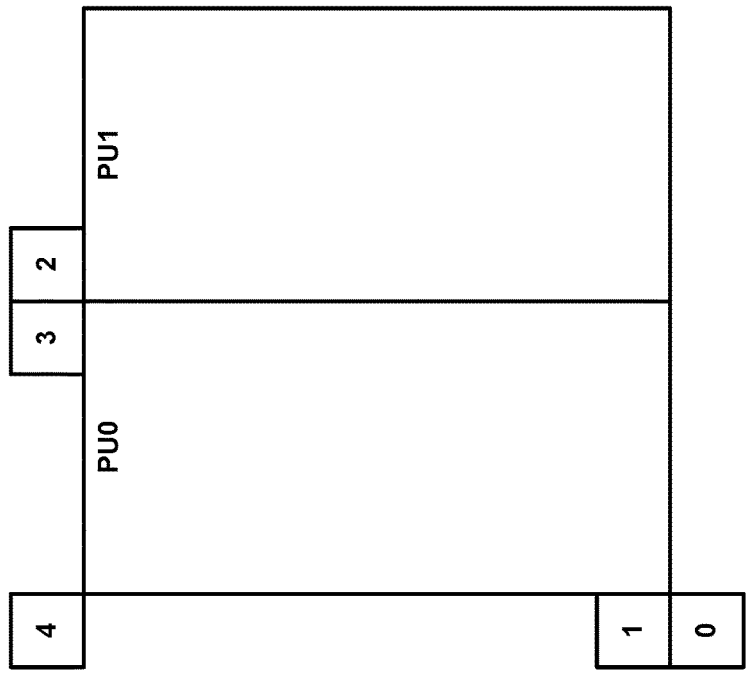
FIG. 2B is an illustration of spatial neighboring motion vector candidates for advanced motion vector prediction mode.
Figure 2A:
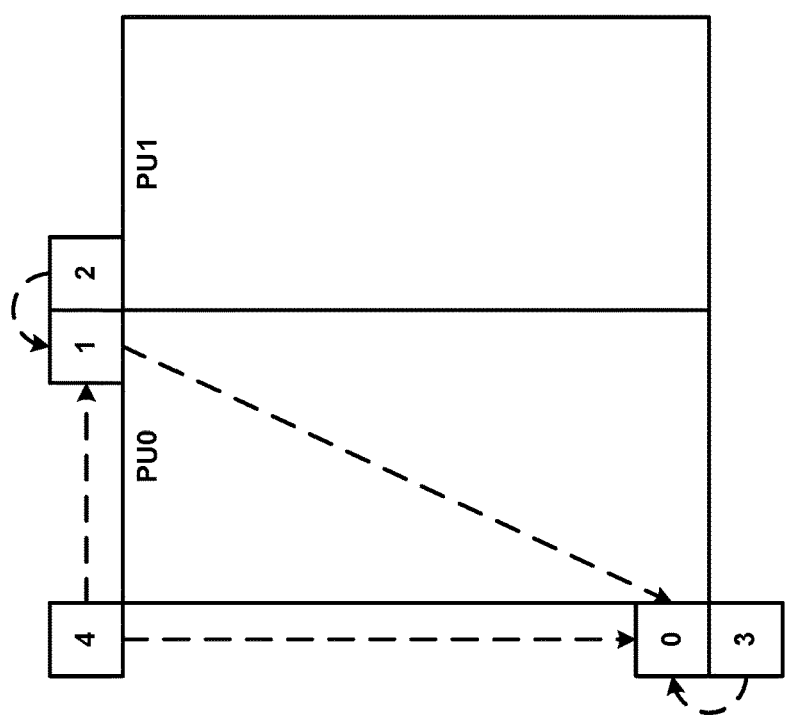
FIG. 2A is an illustration of spatial neighboring motion vector candidates for merge mode.

In merge mode, up to four spatial MV candidates may be derived with the orders showed on FIG. 2A with numbers, and the order may be the following: left (0, A1), above (1, B1), above right (2, B0), below left (3, A0), and above left (4, B2), as shown in FIG. 2A.

In AVMP mode, the neighboring blocks may be divided into two groups: a left group consisting of the block 0 and 1, and an above group consisting of the blocks 2, 3, and 4, as shown on FIG. 2B. For each group, the potential candidate in a neighboring block referring to the same reference picture as that indicated by the signaled reference index may have the highest priority to be chosen to form a final candidate of the group. It is possible that all neighboring blocks may not contain a motion vector pointing to the same reference picture. Therefore, if such a candidate cannot be found, the first available candidate may be scaled to form the final candidate, thus the temporal distance differences may be compensated.

Temporal motion vector prediction in HEVC is discussed in the following. A temporal motion vector predictor (TMVP) candidate, if enabled and available, may be added into the MV candidate list after spatial motion vector candidates. The process of motion vector derivation for TMVP candidate may be the same for both merge and AMVP modes, however the target reference index for the TMVP candidate in the merge mode may be always set to 0.

The primary block location for TMVP candidate derivation may be the bottom right block outside of the collocated PU as shown in FIG, 3A as a block "T", to compensate the bias to the above and left blocks used to generate spatial neighboring candidates. However, if that block is located outside of the current CTB row or motion information is not available, the block may be substituted with a center block of the PU.

A motion vector for a TMVP candidate may be derived from a co-located PU of a co-located picture, indicated in a slice level. The motion vector for the co-located PU may be referred to as a collocated MV.

Figure 3B:
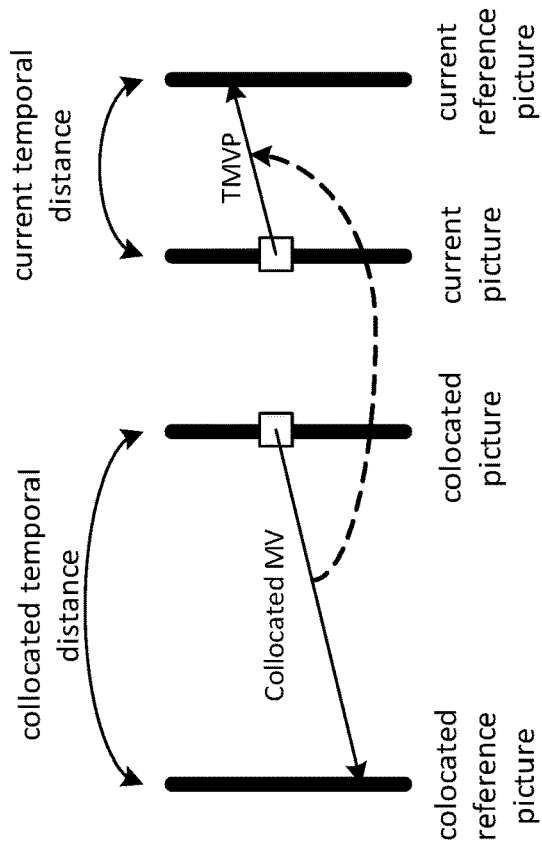
FIG. 3B is an illustration of a motion vector scaling.
Figure 3A:
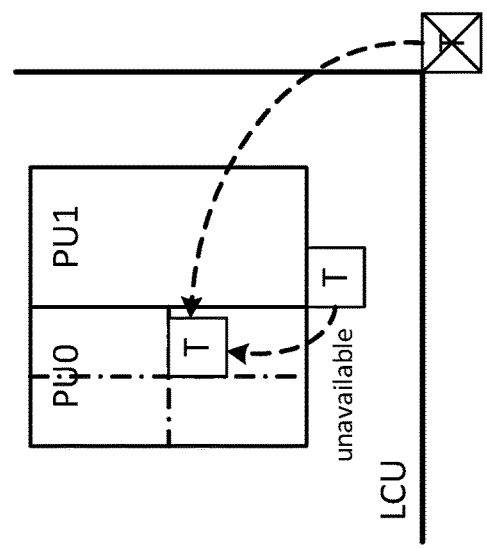
FIG. 3A is an illustration of a temporal motion vector predictor candidate.

Similar to a temporal direct mode in AVC, to derive a TMVP candidate motion vector, a co-located MV may be scaled to compensate temporal distance differences, as shown in FIGS. 3A and 3B.

Other aspects of motion prediction in HEVC are discussed in the following. Several aspects of merge and AMVP modes are discussed in the following. Motion vector scaling is discussed in the following. In the following example the value of motion vectors may be proportional to a distance of pictures in a presentation time. In the example, a motion vector may associate two pictures including a reference picture and a picture containing the motion vector (e.g., the containing picture). When a motion vector is utilized to predict the other motion vector, a distance of the containing picture and the reference picture may be calculated based on the POC values.

For a motion vector to be predicted, both a containing picture associated with the motion vector to be predicted and a reference picture may be different. Therefore, a new distance (e.g., based on a POC) may be calculated. In the example, the motion vector may be scaled based on two POC distances. For a spatial neighboring candidate, the containing pictures for the two motion vectors may be the same, while the reference pictures may be different. In HEVC, motion vector scaling may apply to both TMVP and AMVP for spatial and temporal neighboring candidates, Artificial motion vector candidate generation is discussed in the following. If a motion vector candidate list is not complete, artificial motion vector candidates may be generated and inserted at the end of the list until the list will have all candidates.

In merge mode, there may be two types of artificial MV candidates: a combined candidate derived only for B-slices and a zero candidate used only for AMVP. In some aspects, the zero candidate may be included if the combined candidate derived only for B-slices type does not provide enough artificial candidates.

For each pair of candidates that are already in the candidate list and have necessary motion information, bi-directional combined motion vector candidates may be derived.

In sonic aspects, the bi-directional combined motion vector candidates may be derived by a combination of a motion vector of a first candidate referring to a picture in the list 0 and a motion vector of a second candidate referring to a picture in the list 1.

A pruning process for a candidate insertion is discussed in the following. Candidates from different blocks may happen to be the same, which may decrease the efficiency of a merge/AMVP candidate list. A pruning process may be applied to solve this problem of candidates from different blocks being the same. For example, some techniques may compare one candidate against other candidates in a current candidate list to avoid inserting an identical candidate. To reduce the complexity, only limited numbers of pruning process may be applied instead of comparing each potential candidate with all the other existing candidates.

3D-HEVC is discussed in the following. 3D-HEVC is described in Gerhard Tech; Krzysztof Wegner; Ying Chen; Sehoon Yea (2015-02-18), "3D-HEVC Draft Text 7". JCT-3V. Retrieved Feb. 26, 2015. 3D-HEVC is the 3D video extension of HEVC under development by JCT-3V. The key techniques related to this disclosure are described in this sub-section.

Figure 4:
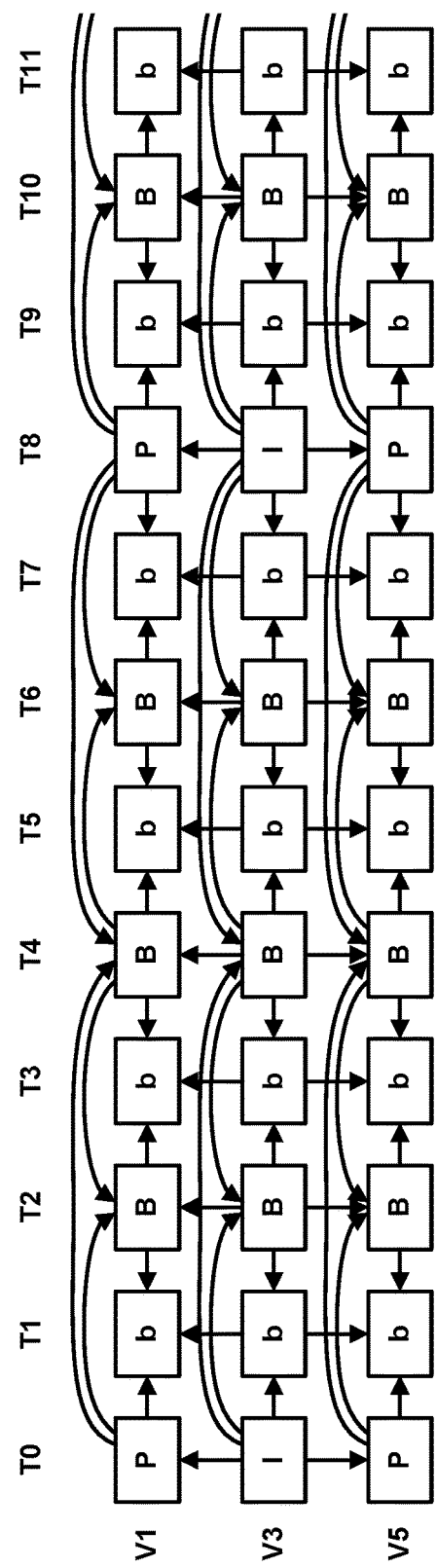
FIG. 4 illustrates a multiview prediction structure for 3-view cases.

It is worth mentioning that the inter-view sample prediction (e.g., from reconstructed samples) may be supported in MV-HEVC. A prediction structure supported in MV-HEVC is shown in FIG. 4.

Both MV-HEVC and 3D-HEVC are compatible to HEVC in a way that the base (texture) view is decodable by HEVC (version 1) decoder.

In MV-HEVC, a current picture in a non-base view may be predicted by both pictures in the same view and pictures in a reference view of the same time instance, by putting both pictures in the same view and pictures in the reference view of the same time instance in reference picture lists of the picture. Therefore, a reference picture list of the current picture may contain both temporal reference pictures and inter-view reference pictures.

A motion vector associated with a reference index corresponding to a temporal reference picture may be denoted as a temporal motion vector. A motion vector associated with a reference index corresponding to an inter-view reference picture may be denoted as a disparity motion vector.

FIG. 4 illustrates a multiview prediction structure for 3-view cases. In the example of FIG. 4, V3 denotes the base view and a picture in a non-base view (V1 or V5). In the example of FIG. 4, V3 may be predicted from pictures in a dependent (base) view of the same time instance.

3D-HEVC supports all features in MV-HEVC, therefore the inter-view sample prediction as mentioned above may be enabled. In addition, more advanced texture only coding tools and depth related/dependent coding tools may be supported. The texture only coding tools may require the identification of the corresponding blocks (between views) that may belong to the same object. Therefore, disparity vector derivation is a basic technology in 3D-HEVC.

Sub-PU motion prediction related to 3D-HEVC is discussed in the following. Sub-PU based inter-view motion prediction in 3D-HEVC is discussed in the following. In 3D-HEVC, a sub-PU level inter-view motion prediction technique for the inter-view merge candidate, i.e., the candidate may be derived from a reference block in the reference view.

Figure 5:
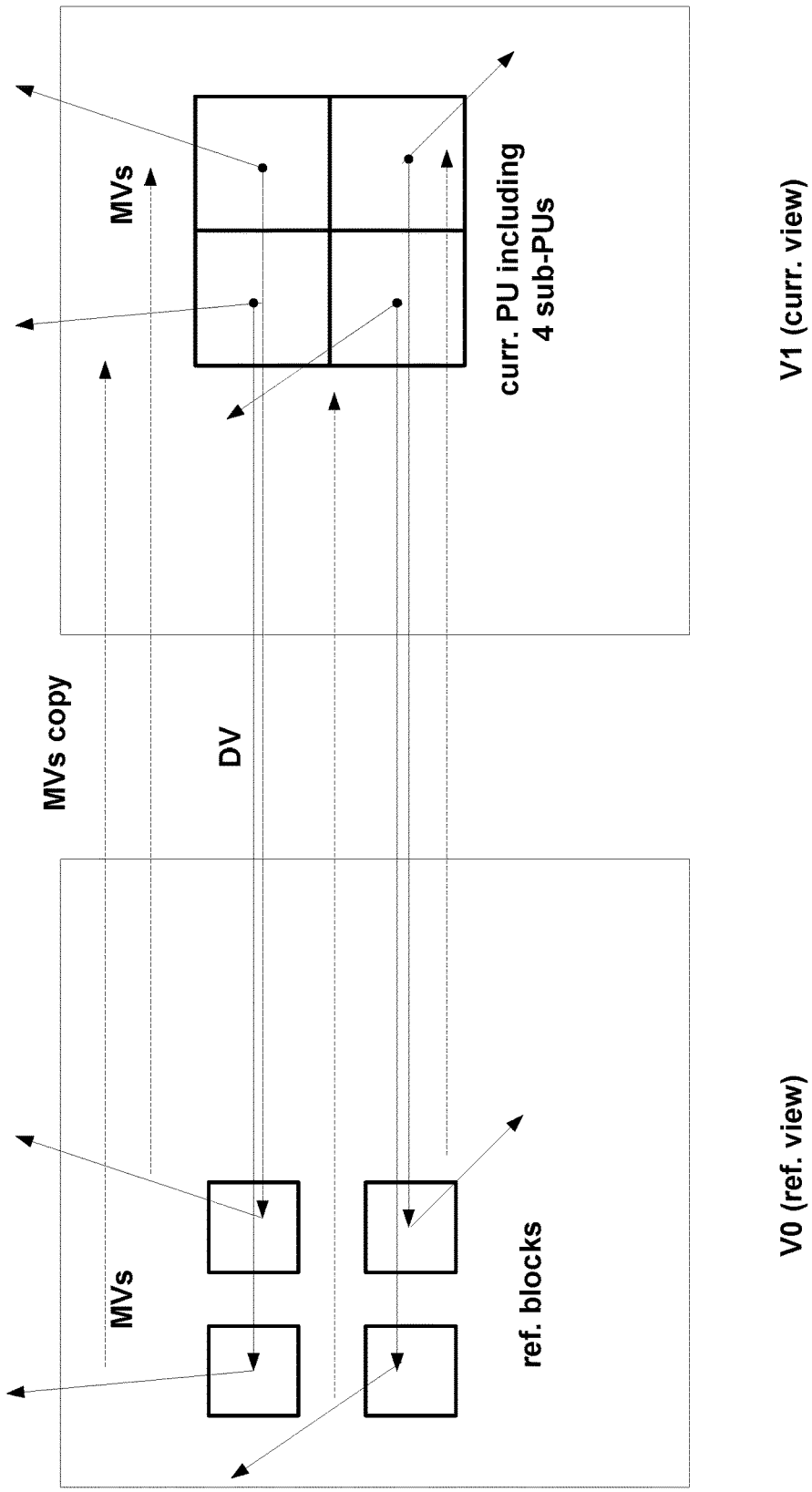
FIG. 5 illustrates a sub-prediction unit (PU) level inter-view motion prediction.

When such a mode is enabled, a current PU may correspond to a reference area (with the same size as current PU identified by the disparity vector) in the reference view. In the example, the reference area may have richer motion information than needed for a generation of a set of motion information for a PU. Therefore, a sub-PU level inter-view motion prediction (SPIVMP) method is proposed as shown in FIG. 5.

This mode may be signalled as a special merge candidate. Each of the sub-PU may contain a full set of motion information. As such, a PU may contain multiple sets of motion information.

Sub-PU based MPI in 3D-HEVC is discussed in the following. Similarly, in depth coding of 3D-HEVC, techniques may be designed such that a motion parameter inheritance (MPI) candidate derived from texture view may be extended in a way similar to a sub-PU level inter-view motion prediction.

For example, if a current depth PU has a co-located region which contains multiple PUs, the current depth PU may be separated into sub-PUs. In the example, each sub-PU of the sub-PUs may have a different set of motion information. This technique may be referred to as a sub-PU MPI.

Examples of sub-PU for 2D video coding is discussed in the following. In Ying Chen, Li Zhang. Two stage temporal motion vector prediction and sub-PU design in 3D-HEVC, U.S. Publication Number 2015/0085929, a sub-PU based advanced TMVP (ATMVP) design has been proposed. In a single-layer coding, a two-stage advanced temporal motion vector prediction design is proposed. The first stage may be utilized to derive a vector identifying the corresponding block of the current PU in a reference picture and a second stage is to extract multiple sets motion information from the corresponding block and assign them to sub-PUs of the PU. Each sub-PU of the PU therefore may be motion compensated separately. The concept of the ATMVP is summarized as follows: Initially, a vector in the first stage may be derived from spatial and temporal neighboring blocks of the current PU. Next, this process may be achieved as activating a merge candidate among all the other merge candidates.

Applicable to single-layer coding and sub-PU temporal motion vector prediction, a PU or CU may have motion refinement data to be conveyed on top of the predictors. Several design aspects of Ying Chen et al., "Two stage temporal motion vector prediction and sub-PU design in 3D-HEVC," U.S. Publication Number 2015/0085929 are highlighted as follows. In a first aspect, the first stage of vector derivation may also be simplified by just a zero vector. In a second aspect, the first stage of vector derivation may include identifying jointly the motion vector and its associated picture. Regarding the second aspect, various ways of selecting the associated picture and further deciding the motion vector to be the first stage vector have been proposed. In a third aspect, if the motion information during the above process is unavailable, the "first stage vector" may be used for substitution. In a fourth aspect, a motion vector identified from a temporal neighbor may be scaled to be used for the current sub-PU, in a way similar to motion vector scaling in TMVP. In the fourth aspect, however, which reference picture such a motion vector may be scaled to can be designed with one of the following ways. In a first way of the fourth aspect, the picture may be identified by a fixed reference index of the current picture. In a second way of the fourth aspect, the picture may be identified to be the reference picture of the corresponding temporal neighbor, if also available in a reference picture list of the current picture. In a third way of the fourth aspect, the picture may be set to be the co-located picture identified in the first stage and from where the motion vectors are grabbed from.

Figure 6:
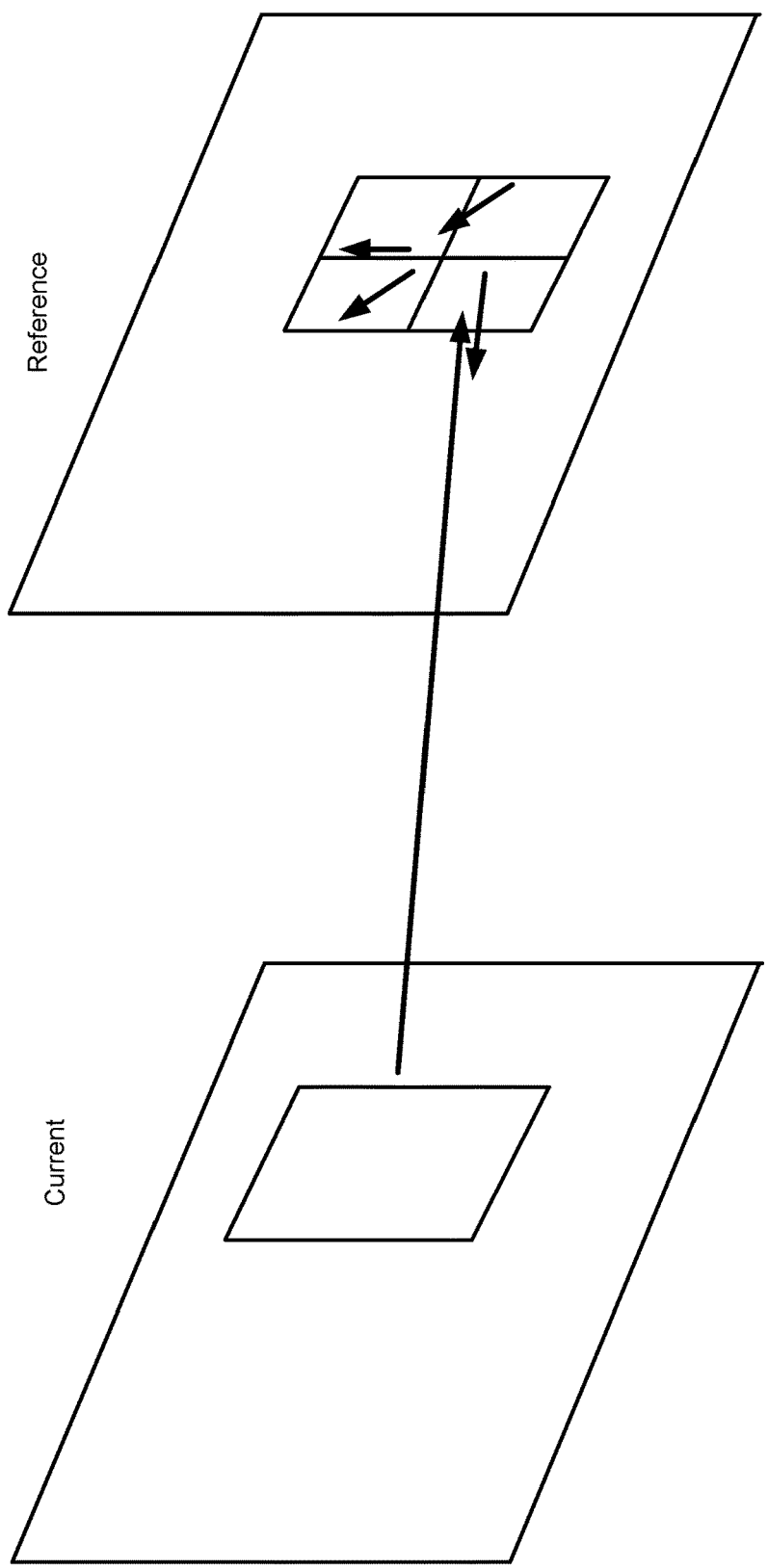
FIG. 6 illustrates a sub-PU motion prediction from a reference picture.
Figure 7:
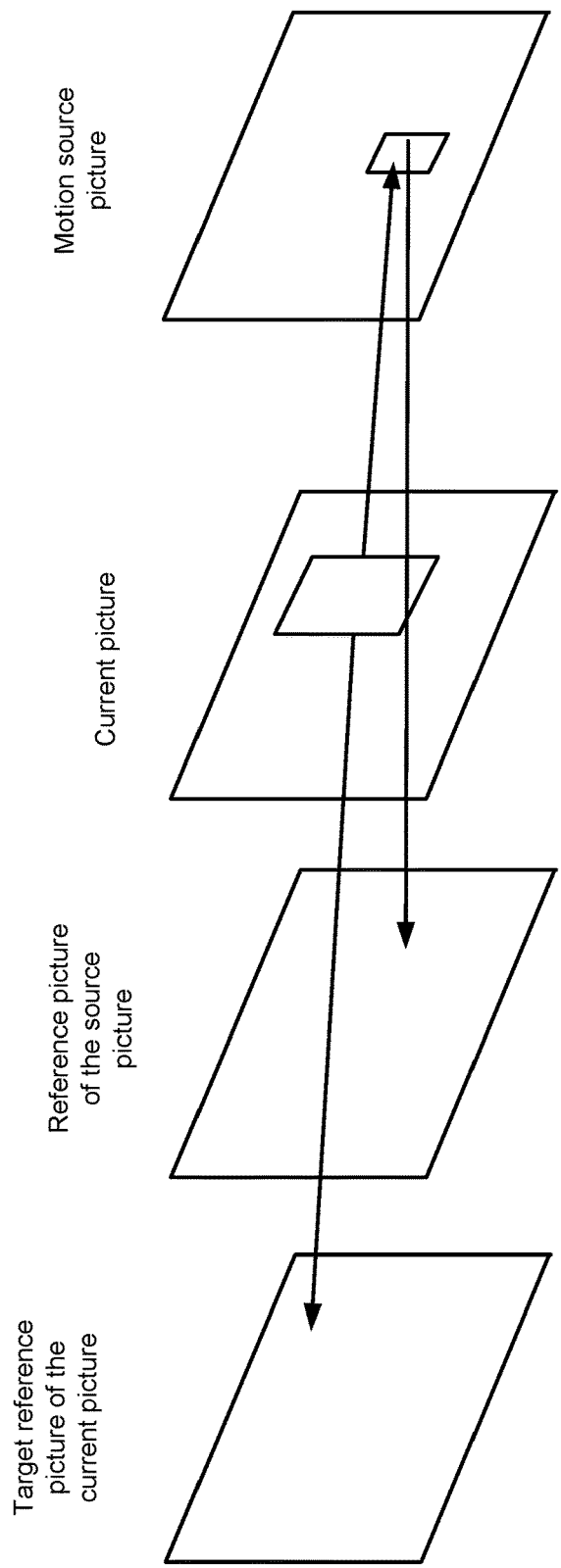
FIG. 7 illustrates relevant pictures in advanced temporal motion vector prediction.

In Ying Chen, Xiang Li, Hongbin Liu, Jianle Chen, Li Zhang, Marta Karczewicz, "Improved sub-PU based advanced temporal motion vector prediction," U.S. Publication Number 2016/0219278, a Sub-PU related to HEW is discussed. FIG. 6 illustrates a sub-PU motion prediction from a reference picture. FIG. 7 illustrates relevant pictures in advanced temporal motion vector predictor (ATMVP). In some examples, the relevant pictures in ATMVP may be similar to the relevant pictures in temporal motion vector predictor (TMVP).

To address some design issues in U.S. Publication Number 2015/0085929, U.S. Publication Number 2016/0219278 proposed the following techniques. First, an example relates to a position of the ATMVP candidate, if inserted, e.g., as a merge candidate list. In this example, a spatial candidates and a TMVP candidate are inserted into a merge candidate in a certain order. The ATMVP candidate may be inserted in any relatively fixed position of those candidates. Additionally, or alternatively, for example, the ATMVP candidate may be inserted after the first two spatial candidates e.g., A1 and B1. Additionally, or alternatively, for example, the ATMVP candidate may be inserted after the first three spatial candidates e.g., A1 and B1 and B0. Additionally, or alternatively, for example, the ATMVP candidate may be inserted after the first four candidates e.g., A1, B1, B0, and A0. Additionally, or alternatively, for example, the ATMVP candidate may be inserted right before the TMVP candidate. Additionally, or alternatively, for example, the ATMVP candidate can be inserted right after the TMVP candidate.

Additionally, or alternatively, the position of ATMVP candidate in the candidate list may be signaled in the bitstream. The positions of other candidates, including the TMVP candidate may be additionally signalled.

An example relates to an availability check of the ATMVP candidate that may be applied by accessing just one set of motion information. When such a set of information is unavailable, e.g., one block being intra-coded, a whole ATMVP candidate may be considered as unavailable. In that case, the ATMVP may not be inserted into the merge list. In the example, a center position, or a center sub-PU may be used purely to check the availability of the ATMVP candidate. When a center sub-PU is used, the center sub-PU may be chosen to be the one that covers the center position. For instance, the center sub-PU may be chosen to be the center 3 position, with a relative coordinate of (W/2, H/2) to the top-left sample of the PU, where W×H is the size of the PU. Such a position or center sub-PU may be used together with the temporal vector to identify a corresponding block in the motion source picture. A set of motion information from the block that covers the center position of a corresponding block may be identified.

An example relates to a representative set of motion information for the ATMVP coded PU from a sub-PU. In a first aspect of the example, to form the ATMVP candidate the representative set of motion information may be first formed. In a second aspect of the example, such a representative set of motion information may be derived from a fixed position or fixed sub-PU. In the second aspect of the example, such a representative set of motion information may be chosen in the same way as that of the set of motion information used to determine the availability of the ATMVP candidate, as described in the previous example. In a third aspect of the example, when a sub-PU has identified its own set of motion information and it is unavailable, it is set to be equal to the representative set of motion information. In a fourth aspect of the example, if the representative set of motion information is set to be that of a sub-PU, no additional motion storage may be needed at the decoder side for the current CTU or slice in the worst case scenario. In a fifth aspect of the example, such a representative set of motion information may be used in all scenarios that when the decoding processes require the whole PU to be represented by one set of motion information, including pruning, the process to generate combined bi-predictive merging candidates.

In an example, an ATMVP candidate is pruned with TMVP candidate and interactions between MVP and ATMVP may be considered. Detailed aspects of the example are listed in the following. In a first aspect of the example, the pruning of a sub-PU based candidate, e.g., ATMVP candidate with a normal candidate may be conducted by using the representative set of motion information (as discussed in the previous example) for such a sub-PU based candidate. If such set of motion information is the same as a normal merge candidate, the two candidates may be considered as the same.

In a second aspect of the example, alternatively, or additionally, a check is performed to determine whether the ATMVP contains multiple different sets of motion information for multiple sub-Pus. In the second aspect of the example, if at least two different sets are identified, the sub-PU based candidate may not be used for pruning. For instance, if at least two different sets are identified, the sub-PU based candidate may be considered to be different to any other candidate. However, if at least two different sets are not identified, the sub-PU based candidate may be used for pruning In a third aspect of the example, alternatively, or additionally, a ATMVP candidate may be pruned with the spatial candidates, e.g., the left and top ones only, with positions denoted as A1 and B1.

In a fourth aspect of the example, alternatively, or additionally, only one candidate may be formed from a temporal reference, being either ATMVP candidate or TMVP candidate. In the fourth aspect of the example, when a ATMVP is available, the candidate may be a ATMVP. However, when the ATMVP is unavailable, the candidate may be a TMVP. Such a candidate may be inserted into the merge candidate list in a position similar to the position of MINT. In this case, the maximum number of candidates may be kept as unchanged. Additionally, or alternatively, a TMVP may be always disabled even when ATMVP is unavailable. Additionally, or alternatively, a TMVP may be used only when ATMVP is unavailable.

In a fifth aspect of the example, additionally or alternatively, when a ATMVP is available and TMVP is unavailable, one set of motion information of one sub-PU is used as the MVP candidate. In the fifth aspect of the example, furthermore, the pruning process between ATMVP and TMVP is not applied.

In a sixth aspect of the example, alternatively, or additionally, the temporal vector used for a ATMVP may be also used for a TMVP, such that the bottom-right position or center 3 position as used for current MINT in HEVC may not to be used. Additionally, or alternatively, a position identified by the temporal vector and the bottom-right and center 3 positions may be jointly considered to provide an available TMVP candidate.

In an example, multiple availability checks for a ATMVP candidate may be supported to give higher chances for the ATMVP candidate to be more accurate and efficient. When the current ATMVP candidate from the motion source picture as identified by the first temporal vector (e.g., as shown in FIG. 7) is unavailable, other pictures may be considered as motion source picture. When another picture is considered, it may be associated with a different second temporal vector, or may be associated simply with a second temporal vector scaled from the first temporal vector that points to the unavailable ATMVP candidate.

In a first aspect of the example, a second temporal vector may identify an ATMVP candidate in a second motion source picture and the same availability check may apply. If the ATMVP candidate as derived from the second motion source picture is available, the ATMVP candidate may be derived and no other pictures may be checked. However, if the ATMVP candidate as derived from the second motion source picture is unavailable, other pictures as motion source pictures may be checked.

In a second aspect of the example, pictures to be checked may be those in the reference picture lists of the current picture, with a given order. For each list, the pictures may be checked in the ascending order of the reference index. List X may be first checked and pictures in list Y (being 1−X) follows. For instance, list X may be chosen so that list X is the list that contains the co-located picture used for TMVP. Additionally, or alternatively, X may simply be set to be 1 or 0.

In a third aspect of the example, pictures to be checked may be those identified by motion vectors of the spatial neighbors, with a given order.

In an example, a partition of a PU that a current ATMVP applies to may be 2N×2N, N×N, 2N×N, N×2N or other AMP partitions, such as 2N×N/2. Additionally, or alternatively, if other partition sizes may be allowed, ATMVP may be supported too, such a size may include e.g., 64×8. Additionally, or alternatively, the mode may be only applied to certain partitions, e.g., 2N×2N.

In an example, the ATMVP candidate may be marked as a different type of merge.

In an example, when identifying a vector (e.g., temporal vector as in the first stage) from neighbors, multiple neighboring positions, e.g., those used in merge candidate list construction can be checked in order. For each of the neighbor, the motion vectors corresponding to reference picture list 0 (list 0) or reference picture list 1 (list 1) may be checked in order. When two motion vectors are available, the motion vectors in list X may be checked first and followed by list Y (with Y being equal to 1−X), so that list X is the list that contains the co-located picture used for TMVP. In ATMVP, a temporal vector may be added as a shift of any center position of a sub-PU, wherein the components of temporal vector may be shifted to integer numbers. Such a shifted center position may be used to identify a smallest unit that motion vectors may be allocated to, e.g., with a size of 4×4 that covers the current center position, Additionally, or alternatively, motion vectors corresponding to list 0 may be checked before those corresponding to list 1. Additionally, or alternatively, motion vectors corresponding to list 1 may be checked before those corresponding to list 0. Additionally, or alternatively, all motion vectors corresponding to list X in all spatial neighbors may be checked in order, followed by the motion vectors corresponding to list Y (with Y being equal to 1−X). Here X may be the one that indicates where co-located picture belongs to or may be set to be 0 or 1. Additionally, or alternatively, the order of the spatial neighbors may be the same as that used in HEVC merge mode.

In an example, when in the first stage of identifying a temporal vector does not include identifying a reference picture, the motion source picture as shown in FIG. 7, may be simply set to be a fixed picture, e.g., the co-located picture used for TMVP. Additionally, or alternatively, in such a case the vector may only be identified from the motion vectors that point to such a fixed picture. Additionally, or alternatively, in such a case the vector may only be identified from the motion vectors that point to any picture but further scaled towards the fixed picture.

In an example, when in the first stage of identifying a vector includes identifying a reference picture, the motion source picture as shown in FIG. 7, one or more of the following additional checks may apply for a candidate motion vector. If the motion vector is associated with a picture or slice that is intra coded, such a motion vector may be considered as unavailable and may not be used to be converted to the vector. Additionally, or alternatively, if the motion vector identifies an intra block (by e.g., adding the current center coordinate with the motion vector) in the associated a picture, such a motion vector is considered as unavailable and may not be used to be converted to the vector.

In an example, when in the first stage of identifying a vector, the components of the vector may be set to be (half width of the current PU, half height of the current PU), so that it may identify a bottom-right pixel position in the motion source picture. In this example, (x, y) may indicate horizontal and vertical components of one motion vector. Additionally, or alternatively, the components of the vector may be set to be (sum(half width of the current PU, M), sum(half height of the current PU, N)), where the function sum(a, b) returns the sum of a and b. In an aspect of the example, when the motion information is stored in 4×4 unit, M and N may be both set to be equal to 2. In another aspect of the example, when the motion information is stored in 8×8 unit, M and N may be both set to be equal to 4.

In an example, a sub-block/sub-PU size when an ATMVP applies may be signalled in a parameter set, e.g., sequence parameter set of picture parameter set. A size may range from the least PU size to the CTU size. The size may also be pre-defined or signaled. The size may be e.g., as small as 4×4. Additionally, or alternatively, the sub-block/sub-PU size may be derived based on the size of PU or CU. For instance, the sub-block/sub-PU may be set equal to max (4×4, (width of CU)>>M). The value of M may be pre-defined or signaled in the bitstream.

In an example, a maximum number of merge candidates may be increased by 1 due to the fact that an ATMVP may be considered as a new merge candidate. For instance, compared to HEW which may take up to 5 candidates in a merge candidate list after pruning, the maximum number of merge candidates may be increased to 6. Additionally, or alternatively, pruning with conventional TMVP candidate or unification with the conventional TMVP candidate may be performed for ATMVP such that the maximum number of merge candidates may be kept as unchanged. Additionally, or alternatively, when ATMVP is identified to be available, a spatial neighboring candidate may be excluded from the merge candidate list, e.g. the last spatial neighboring candidate in fetching order is excluded.

In an example, when multiple spatial neighboring motion vectors are considered to derive the temporal vector, a motion vector similarity may be calculated based on the neighboring motion vectors of the current PU as well as the neighboring motion vectors identified by a specific temporal vector being set equal to a motion vector. The one that leads to the highest motion similarity may be chosen as the final temporal vector.

In a first aspect of the example, for each motion vector from a neighboring position N, it may identify a block same size as the current PU) in the motion source picture, wherein its neighboring position N contains a set of the motion information. This set of motion vector may be compared with the set of motion information as in the neighboring position N of the current block.

In a second aspect of the example, for each motion vector from a neighboring position N, it may identify a block in the motion source picture, wherein its neighboring positions contain multiple sets of motion information. These multiple sets of motion vector may be compared with the multiple sets of motion information from the neighboring positions of the current PU in the same relative positions. A motion information similarity may be calculated. For instance, the current PU may have the following sets of motion information from A1, B1, A0 and B0, denoted as $MI_{A1}$, $MI_{B1}$, $MI_{A0}$ and $MI_{B0}$. For a temporal vector TV, it may identify a block corresponding to the PU in the motion source picture. Such a block may have motion information from the same relative A1, B1, A0 and B0 positions, and may be denoted as $TMI_{A1}$, $TMI_{B1}$, $TMI_{A0}$ and $TMI_{B0}$. The motion similarity as determined by TV may be calculated as $MS_{tv} = \Sigma_{N \in \{A1,B1,A0,B0\}} MVSim(MI_N, TMI_N)$, wherein MVSim defines the similarity between two sets of motion information.

In both of the first and second aspects of the example, the motion similarity MVSim may be used, wherein the two input parameters may be the two motion information, each may contain up to two motion vectors and two reference indices. Since each pair of the motion vectors in list X may be actually associated with reference pictures in different list X of different pictures, the current picture and the motion source picture. For each of the two motion vectors $MVX_N$ and $TMVX_N$ (with X being equal to 0 or 1), the motion vector difference $MVDX_N$ may be calculated as $MVX_N - TMVX_N$. Afterwards, the difference MVSimX may be calculated as e.g., $abs(MVDX_N[0]) + abs(MVDX_N[1])$, or $(MVDX_N[0]*MVDX_N[0] + MVDX_N[1]*MVDX_N[1])$. If both sets of motion information contains available motion vectors, MVSim may be set equal to MVSim0+MVSim1.

In order to have a unified calculation of the motion difference, both of the motion vectors may need to be scaled towards the same fixed picture, which can be e.g., the first reference picture RefPicListX[0] of the list X of the current picture.

If the availability of the motion vector in list X from the first set and the availability of the motion vector in list X from the second set may be different, one reference index is −1 while the other is not. Such two sets of motion information may be considered as not similar in direction X. If the two sets are not similar in both sets, the final MVSim function may return a big value T, which may be e.g., considered as infinite.

Additionally, or alternatively, for a pair of sets of motion information, if one is predicted from list X (X being equal to 0 or 1) but not list Y (Y being equal to 1−X) and the other has the same status, a weighting between 1 and 2 (e.g., MVSim is equal to MVSim*1.5) may be applied. When one set is only predicted from list X and the other is only predicted from list Y, MVSim may be set to a big value T.

Additionally, or alternatively, for any set of motion information, as long as one motion vector is available, both motion vectors may be produced. In the case that only one motion vector is available (corresponding to list X), it may be scaled to form the motion vector corresponding to the other list Y.

Additionally, or alternatively, the motion vector may be measured based on a difference between neighboring pixels of the current PU and neighboring pixels of the block (same size as the current PU) identified by the motion vector. The motion vector that leads to the smallest difference may be chosen as a final temporal vector.

In an example, when deriving a temporal vector of a current block, motion vectors and/or temporal vectors from neighboring blocks that are coded with ATMVP may have a higher priority than motion vectors from other neighboring blocks.

In a first aspect of the example, only temporal vectors of neighboring blocks may be checked first, the first available one may be set to the temporal vector of the current block. Only when such temporal vectors are not present, normal motion vectors may be further checked. In this case, temporal vectors for ATMVP coded blocks may be stored.

In a second aspect of the example, only motion vectors from ATMVP coded neighboring blocks may be checked first, the first available one may be set to the temporal vector of the current block. Only when such temporal vectors are not present, normal motion vectors may be further checked.

In a third aspect of the example, only motion vectors from ATMVP coded neighboring blocks may be checked first, the first available one may be set to the temporal vector of the current block. If such motion vectors are not available, the checking of temporal vector continues similar as in the first aspect of the example.

In a fourth aspect of the example, temporal vectors from neighboring blocks may be checked first, the first available one may be set to the temporal vector of the current block. If such motion vectors are not available, the checking of temporal vector continues similar as in the second aspect of the example.

In an aspect of the example, temporal vectors and motion vectors of ATMVP coded neighboring blocks may be checked first, the first available one may be set to the temporal vector of the current block. Only when such temporal vectors and motion vectors are not present, normal motion vectors may be further checked.

In some examples, when multiple spatial neighboring motion vectors are considered to derive the temporal vector, a motion vector may be chosen so that it minimizes the distortion that are calculated from pixel domain, e.g., template matching may be used to derive the temporal vector such that the one leads to minimal matching cost is selected as the final temporal vector.

In some examples, derivation of a set of motion information from a corresponding block (in the motion source picture) may be done in a way that when a motion vector is available in the corresponding block for any list X (denote the motion vector to be MVX), for the current sub-PU of the ATMVP candidate, the motion vector may be considered as available for list X (by scaling the MVX). If the motion vector is unavailable in the corresponding block for any list X, the motion vector may be considered as unavailable for list X.

Additionally, or alternatively, when a motion vector in the corresponding block is unavailable for list X but available for list 1−X (denoted 1−X by Y and denote the motion vector to be MVY), the motion vector may still be considered as available for list X (by scaling the MVY towards the target reference picture in list X.

Additionally, or alternatively, when both motion vectors in the corresponding block for list X and list Y (equal to 1−X) are available, the motion vectors from list X and list Y may not necessary be used to be directly scaled to generate the two motion vectors of a current sub-PU by scaling. In one aspect of the example, when formulating a ATMVP candidate, the low-delay check as done in a TMVP may apply to each sub-PU. If for every picture (denoted by refPic) in every reference picture list of the current slice, POC of refPic is smaller than POC of current slice, a current slice may be considered with low-delay mode. In this low-delay mode, motion vectors from list X and list Y may be scaled to generate the motion vectors of a current sub-PU for list X and list Y respectively. When not in the low-delay mode, only one motion vector MVZ from MVX or MVY may be chosen and scaled to generate the two motion vectors for a current sub-PU. Similar to TMVP, in such a case Z may be set equal to collocated_from_10_flag, meaning that it depends on whether the co-located picture as in TMVP is in the list X or list Y of the current picture. Additionally, or alternatively, Z may be set as follows: if the motion source picture is identified from list X, Z is set to X. Additionally, or alternatively, when the motion source pictures belong to both reference picture lists, and RefPicList0[idx0] is the motion source picture that is first present in list 0 and RefPicList(1)[idx1] is the motion source picture that is first present in list 1, Z may be set to be 0 if idx0 is smaller than or equal to idx1, and may be set to be 1 otherwise.

In an example, the motion source picture may be signalled. In detail, a flag indicating whether the motion source picture is from list 0 or list 1 may be signalled for a B slice. Additionally, or alternatively, a reference index to a list 0 or list 1 of the current picture may be signalled to identify the motion source picture.

In an example, when identifying a temporal vector, a vector may be considered as unavailable (thus other ones can be considered) if it points to an intra coded block in an associated motion source picture.

Figure 8:
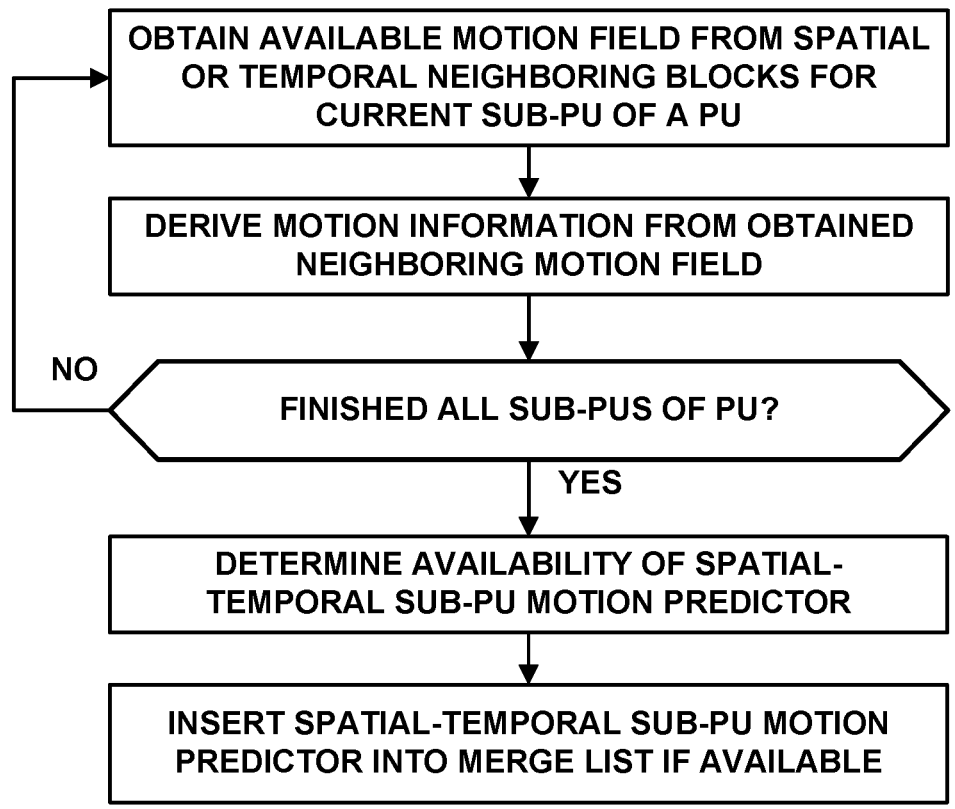
FIG. 8 is a flowchart of spatial-temporal motion vector predictor derivation.

In Wei-Jung Chien, Xianglin Wang, Li Zhang, Hongbin Liu, hark Chen, Marta. Karczewicz, "Sub-PU motion vector prediction using spatial-temporal motion information," U.S. Publication Number 2016/0366435 (U.S. application Ser. No. 15/176,790), a Sub-PU related to HEVC is discussed. FIG. 8 is a flowchart of spatial-temporal motion vector predictor derivation.

In an example, to enhance the performance using sub-PU motion prediction, spatial-temporal motion information of neighboring sub-PUs may be exploited as described in U.S. application Ser. No. 15/176,790. In U.S. application Ser. No. 15/176,790, the motion vector for each sub-PU may be derived from the information of neighboring blocks in three-dimensional domain. It means the neighboring blocks may be the spatial neighbors in the current picture or the temporal neighbors in previous coded pictures. FIG. 8 shows the flow chart of the spatial-temporal motion vector predictor (STMVP) derivation process. Besides what is described below, the techniques described with respect to Ying Chen, Xiang Li, Hongbin Liu, Jianle Chen, Li Zhang, Marta Karczewicz, "Improved sub-PU based advanced temporal motion vector prediction," U.S. Publication Number 2016/0219278, could be directly extended to STMVP.

In the following description, the term "block" may be used to refer the block-unit for storage of prediction related info, e.g. inter or intra prediction, intra prediction mode, motion information etc. Such prediction info may be saved and may be used for coding future blocks, e.g. predicting the prediction mode information for future blocks. In AVC and HEVC, the size of such a block is 4×4.

It is noted that in the following description, 'PU' may indicate the inter-coded block unit and sub-PU may indicate the unit that derives the motion information from neighbouring blocks.

Any combination of the following techniques may be applied.

Techniques related to Obtaining motion information from neighboring blocks are discussed below. Techniques related to sizes of sub-PU and neighboring blocks are discussed below.

Figure 9:
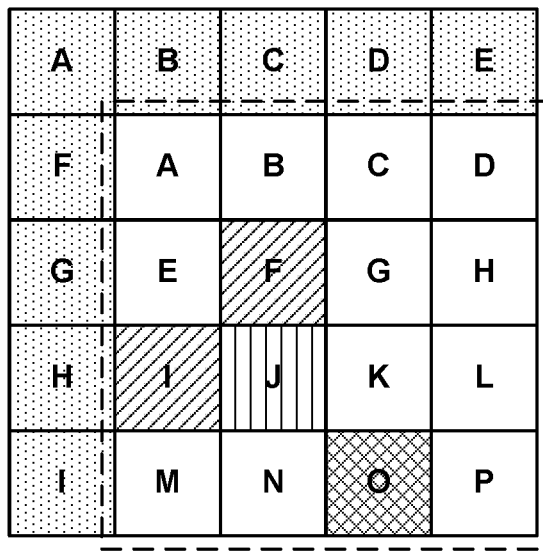
FIG. 9 illustrates a first exemplary PU and neighboring blocks of the PU.
Figure 10:
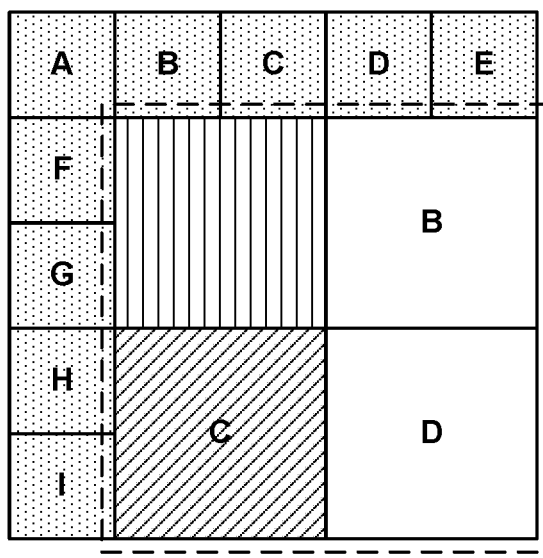
FIG. 10 illustrates a second exemplary PU and neighboring blocks of the PU.

Considering a PU with multiple sub-PUs, the size of a sub-PU is usually equal to or bigger than that neighboring block size. In one example, as shown in FIG. 9, shaded squares represent neighboring blocks (represented using lower-case letters, a, b, . . . i) that are outside of the current PU and the remaining squares (represented using upper-case letters, A, B, . . . , P) represent the sub-PUs in the current PU. The sizes of a sub-PU and its neighboring blocks are the same. For example, the size is equal to 4×4. FIG. 9 shows another example where sub-PUs are larger than the neighboring blocks. In this manner, sizes of neighboring blocks used for motion information derivation may be equal to or smaller than sizes of the sub-blocks for which motion information is derived. Alternatively, sub-PUs may take non-squared shapes, such as rectangle or triangle shapes. Furthermore, the size of the sub-PU may be signaled in the slice header. In some examples, the process discussed above regarding signaling sub-block or sub-PU sizes, in a parameter set, may be extended to these techniques. For example, the sub-PU size may be signaled in a parameter set, such as a sequence parameter set (SPS) or a picture parameter set (PPS).

With respect to the example of FIG. 9, assume that the video coder applies a raster scan order (A, B, C, D, E, etc.) to the sub-PUs to derive motion prediction for the sub-blocks. However, other scan orders may be applied also and it should be noted that these techniques are not limited to raster scan order only.

Neighboring blocks may be classified into two different types: spatial and temporal. A spatial neighboring block is an already coded block or an already scanned sub-PU that is in the current picture or slice and neighboring to the current sub-PU. A temporal neighboring block is a block in the previous coded picture and neighboring to the co-located block of the current sub-PU. In one example, the video coder uses all the reference pictures associated with a current PU to obtain the temporal neighboring block. In another example, the video coder uses a sub-set of reference pictures for STMVP derivation, e.g., only the first entry of each reference picture list.

Following these definitions, for sub-PU (A), with further reference to FIG. 9, all white blocks (a, b, . . . , i) and their collocated blocks in previously coded pictures are spatial and temporal neighboring blocks that are treated as available. According to raster scan order, blocks B, C, D, E . . . P are not spatially available for sub-PU (A). Though all sub-PUs (from A to P) are temporally available neighboring blocks for sub-PU (A), because their motion information can be found in their collocated blocks in previous coded pictures. Take sub-PU (G) as another example: its spatial neighboring blocks that are available include those from a, b . . . to i, and also from A to F. Furthermore, in some examples, certain restriction may be applied to the spatial neighbouring blocks, e.g., the spatial neighbouring blocks (i.e., from a, b . . . to i) may be restricted to be in the same LCU/slice/tile.

In accordance with a technique of this disclosure, a video coder (e.g., video encoder 20 or video decoder 30) may select a subset of all available neighboring blocks to derive motion information or a motion field for each sub-PU. The subset used for derivation of each PU may be pre-defined; alternatively, video encoder 20 may signal (and video decoder 30 may receive signaled data indicating) the subset as high level syntax in a slice header, PPS, SPS, or the like. To optimize the coding performance, the subset may be different for each sub-PU. In practice, a fixed pattern of location for the subset is preferred for simplicity. For example, each sub-PU may use its immediate above spatial neighbor, its immediate left spatial neighbor and its immediate bottom-right temporal neighbor as the subset. With respect to the example of FIG. 11A, when considering sub-PU (J) (horizontally hashed), the block above (F) and the block left (I) (diagonally down-left hashed) are spatially available neighboring blocks, and the bottom-right block (O) (diagonally hashed in both directions) is a temporally available neighboring block. With such a subset, sub-PUs in the current PU are to be processed sequentially (in the defined order, such as raster scan order) due to processing dependency.

Additionally, or alternatively, when considering sub-PU (J), video encoder 20 and video decoder 30 may treat the block above (F) and the block left (I) as spatially available neighboring blocks, and the bottom block (N) and the right block (K) as temporally available neighboring blocks. With such a subset, video encoder 20 and video decoder 30 may process sub-PUs in the current PU sequentially due to processing dependency.

To allow paralleling processing of each sub-PU in the current PU, video encoder 20 and video decoder 30 may use a different subset of neighboring blocks for some sub-PUs for motion prediction derivation. In one example, a subset may be defined that only contains spatial neighbor blocks that do not belong to the current PU, e.g. blocks a,b, . . . i. In this case, parallel processing would be possible.

In another example, for a given sub-PU, if the sub-PUs spatial neighboring block is within the current PU, the collocated block of that spatial neighboring block may be put in the subset and used to derive the motion information of the current sub-PU. For example, when considering sub-PU (J), the temporal collocated blocks of the above block (F) and the left block (I) and bottom-right block (O) are selected as the subset to derive the motion of the sub-PU (J). In this case, the subset for sub-PU (J) contains three temporal neighboring blocks. In another example, a partially-paralleling process may be enabled wherein one PU is split into several regions and each region (covering several sub-PUs) could be processed independently.

Sometimes the neighboring blocks are intra-coded, wherein it is desirable to have a rule to determine replacement motion information for those blocks for better motion prediction and coding efficiency. For example, considering sub-PU (A), there might be cases where blocks b, c, and/or f are intra-coded, and a, d, e, g, h, and i are inter-coded.

For spatial neighbors, video encoder 20 and video decoder 30 may use a pre-defined order to populate the motion information of intra-coded blocks with that of the first found inter coded block. For example, the searching order of the above neighbors can be set as starting from the immediate above neighbor rightward until the rightmost neighbor, meaning the order of b, c, d, and e. The search order of the left neighbors can be set as starting from the immediate left neighbor downward until the bottommost neighbor, meaning the order of f, g, h, and i. If no inter-coded block is found through the search process, then above or left spatial neighbor is considered unavailable.

For temporal neighbors, the same rule as specified in the TMVP derivation can be used. However, it should be noted that other rules can also be used, e.g. rules based on motion direction, temporal distance (search in different reference pictures) and spatial locations, etc.

Video encoder 20 and video decoder 30 may use the following techniques for deriving motion information for a given sub-PU in accordance with the techniques of this disclosure. Video encoder 20 and video decoder 30 may first determine a target reference picture, and perform motion vector scaling. For each neighboring block, motion vector scaling may be applied to its motion vector based on each reference picture list in order to map all the neighboring blocks' motion vectors to the same reference picture in each list. There are two steps: first, determine a source motion vector to be used for scaling. Second, determine a target reference picture where the source motion vector is projected to.

For the first step, several techniques can be used. In a first aspect, for each reference list, motion vector scaling is independent from a motion vector in another reference list; for a given block's motion information, if there is no motion vector in a reference list (e.g. uni-prediction mode instead of bi-prediction mode), no motion vector scaling is performed for that list. For a second aspect, motion vector scaling is not independent from motion vector in another reference list; for a given block's motion information, if no motion vector is unavailable in a reference list, it can be scaled from the one in another reference list. In a third aspect, both motion vectors are scaled from one pre-defined reference list (as in TMVP).

In one example, in accordance with the techniques of this disclosure, video encoder 20 and video decoder 30 use the first aspect for scaling motion vectors of spatial neighboring blocks, and the third aspect above for scaling motion vectors of temporal neighboring blocks. However, other combinations may be used in other examples.

As for the second step, the target reference picture can be selected according to a certain rule based on the motion information (e.g. reference pictures) of available spatial neighboring blocks. One example of such a rule is the majority rule, i.e., selecting the reference picture shared by majority of the blocks. In this case, there is no signaling needed for the target reference picture from the encoder to decoder because the same information can also be inferred at decoder side using the same rule. Alternatively, such reference picture may also be specified explicitly in slice header, or signalled in some other methods to decoder. In one example, the target reference picture is determined as the first reference picture (refidx=0) of each reference list.

After determining the target reference picture and scaling the motion vectors as necessary, video encoder 20 and video decoder 30 derive motion information for a given sub-PU. Assume there are N available neighboring blocks with motion information for a given sub-PU. First, video encoder 20 and video decoder 30 determine the prediction direction (InterDir).

One simple technique for determining the prediction direction is as follows. In a first aspect, InterDir is initialized as zero, then looping through the motion information of N available neighboring blocks. In a second aspect, InterDir= (InterDir bitwiseOR 1), if there is at least one motion vector in List 0, In a second aspect, InterDir=(InterDir bitwiseOR 2), if there is at least one motion vector in List 1.

Here "bitwiseOR" represent the bitwise OR operation. The value of InterDir is defined as: 0 (no inter prediction), 1 (inter prediction based on List 0), 2 (inter prediction based on List 1), and 3 (inter prediction based on both List 0 and List 1), in this example.

Additionally, or alternatively, similar to the determination on target reference picture for motion vector scaling described above, the majority rule may be used to determine the value of InterDir for the given sub-PU based on all available neighboring blocks' motion information.

After InterDir is determined, motion vectors can be derived. For each reference list based on the derived InterDir, there may be M motion vectors (M<=N) available through motion vector scaling to a target reference picture as discussed above. The motion vector for the reference list can be derived as:

$$(MV_x, MV_y) = ((\Sigma_{i=0}^{M} w_i * MV_{xi} + O_i)/\Sigma_{i=0}^{M} w_i, (\Sigma_{j=0}^{M} w_j * MV_{yj} + I_j)/\Sigma_{j=0}^{M} w_j)$$

In the above equation, $w_i$ and $w_j$ are the weighting factors for the horizontal and the vertical motion component respectively, and $O_i$ and $O_j$ are the offset values that are dependent on the weighting factors.

The weighting factors may be determined based on various factors. In one example, the same rule may be applied to all sub-PUs within one PU. The rule may be defined as follows. In an aspect, the weighting factors may be determined based on various factors. In one example, the same rule may be applied to all sub-PUs within one PU. The rule may be defined as follows. For example, the weighting factor may be determined based on the location distance of the current sub-PU and a corresponding neighboring block. In another example, the weighting factor can also be determined based on the POC distance between the target reference picture and the reference picture associated with a corresponding neighboring block's motion vector before scaling. In yet another example, the weighting factor may be determined based on motion vector difference or consistency. For simplicity, all the weighting factors may also be set to 1.

Additionally, or alternatively, different rules may be applied to sub-PUs within one PU. For example, the above rule may be applied, in addition, for sub-PUs located at the first row/first column, the weighting factors for motion vectors derived from temporal neighboring blocks may be set to 0 while for the remaining blocks, the weighting factors for motion vectors derived from spatial neighboring blocks are set to 0.

It should be noted that in practice, the equations above may be implemented as it is, or simplified for easy implementation. For example, to avoid division or floating point operation, fixed point operation may be used to approximate the equation above. One instance is that to avoid divide by 3, one may instead choose to multiply with 43/128 to replace division operation with multiplication and bit-shift. Those variations in implementation should be considered covered under the same spirit of this disclosure.

Additionally, or alternatively, non-linear operation may be also applied to derive the motion vectors, such as median filter.

It is proposed that even the motion vector predictors of each sub-PU are available, the STMVP mode may be reset to be unavailable for one PU.

For example, once a motion vector predictor of each sub-PU is derived for a given PU, some availability checks may be performed to determine if STMVP mode should be made available for the given PU. Such an operation may be used to eliminate the cases where it is very unlikely for STMVP mode to be finally chosen for a given PU. When STMVP mode is not available, mode signaling may not include STMVP. In case that STMVP mode is implemented by inserting SMTVP in merge list, the merge list may not include this STMVP candidate when STMVP mode is determined to be not available. As a result, signaling overhead may be reduced.

Consider one PU partitioned into M sub-PUs. In an example, if N1 (N1<=M) sub-PUs among the M sub-PUs have the same motion vector predictor (i.e., same motion vectors and same reference picture indices), STMVP may be only made available when N1 is smaller than a threshold or the predictor is different from other motion vector predictors (with smaller merge index) the merge list. In another example, if N2 (N2<=M) sub-PUs under STMVP mode share the same motion vector predictors as corresponding sub-PUs under ATMVP, STMVP may be only made available when N2 is smaller than another threshold.

In an examples, both thresholds for N1 and N2 are set equal to M.

Merge list insertion is discussed in the following. If STMVP is available, it may be inserted into merge list. The process in Wei-Jung Chien, Xianglin Wang, Li Zhang, Hongbin Liu, Jianle Chen, Marta Karczewicz. Sub-PU motion vector prediction using spatial-temporal motion information, U.S. Publication Number 2016/0366435 (U.S. application Ser. No. 15/176,790) may be extended and STMVP may be inserted either before or after ATMVP. In one embodiment, STMVP may be inserted right after ATMVP in the merge list.

Techniques described herein present a novel Sub-PU based bidirectional motion compensation (SubBi) technique that can reduce the bidirectional motion compensation cost and maintain high motion compensation accuracy.

As previously discussed, there may be two reference picture list in bidirectional motion compensation, called RefPicList0 and RefPicList1, respectively, which contain at least one reference picture (frame) in each list. The reference pictures in the two list could be identical or have some overlap.

In general, previous bidirectional motion compensation methods may utilize one of the unidirectional motion compensation (in RefPicList0 or RefPicList1) motion vector as the starting point, scaling it to the other direction and find the motion vector that, after combine two PU predictions, may generate the final motion compensation of PU. Previous motion vector prediction techniques try to reuse the spatial and temporal neighboring motion vectors by assuming that the local motions are highly correlated. If a cost of motion vector prediction is smaller than searching approaches (unidirectional or bidirectional), no motion vector may need to be transmitted. In order to increase the motion vector prediction accuracy, a ATMVP (see Chen et al., U.S. Publication Number 2016/021927 and Wei-Jung Chien, Xianglin Wang, Li Zhang, Hongbin Liu, Jianle Chen, Marta Karczewicz. Sub-PU motion vector prediction using spatial-temporal motion information, U.S. Publication Number 2016/0366435 (U.S. application Ser. No. 15/176,790) predicting the motion vectors in Sub-PU level (4×4). However, directly reusing the Sub-PU level motion vector prediction may not capture the motion accuracy enough.

Bidirectional motion compensation may use two sets of motion vectors and their reference indexes (RefIdx) may be signaled. Comparing to the unidirectional motion compensation, the cost of extra motion vector may be significant, if the value of motion vector differences (MVD) are large. On the other hand, if both motion vectors are derived from motion vector prediction techniques as ATMVP described above, the motion compensation may also lack of accuracy. Thus, predicting motion vector from one direction and then searching and transmitting on the other is a solution to leverage the problems of bidirectional motion compensation and ATMVP.

This observation motivates Sub-PU prediction based bidirectional motion compensation that combines the Sub-PU level motion vector prediction and regular bidirectional motion compensation.

For example, let RefPicListPred be the reference picture list that motion vector prediction is applied. Then the other motion vector is coming from searching in reference picture list RefPicListSearch, The RefIdx in RefPicListPred is labeled as RefIdxPred and the RefIdx in RefPicListSearch is labeled as RefIdxSearch.

In this disclosure, the motion vector of RefPicListPred may not be signaled. The decoder may initiate the SubBi mode once the decoder receives an interSubBiFlag=I signal. The motion information of RefPicListSearch may be decoded exactly as unidirectional motion compensation.

Said differently, video decoder 30 may, for each respective sub-block of the plurality of sub-blocks, determine, based on a respective motion vector difference for the respective sub-block signaled in a bitstream, a motion vector for the respective sub-block. More specifically, for example, video decoder 30 may, for each respective sub-block of the plurality of sub-blocks, obtain, from a bitstream signaled by source device 12, a reference picture list indicator (e.g., RefPicListSearch) for the respective sub-block and a reference index (e.g., RefIdxSearch) for the respective sub-block. In this example, the reference picture list indicator (e.g., RefPicListSearch) is for the respective sub-block indicating a respective reference picture list for the respective-sub-block. In this example, the reference index (e.g., RefIdxSearch) is for the respective sub-block indicating a reference picture for the respective sub-block in the reference picture list (e.g., RefPicListSearch) for the respective sub-block. Video decoder 30 may determine a motion vector for the reference picture for the respective sub-block. In other words, video decoder 30 may use a horizontal component and a vertical component of a motion vector that represents motion of the reference picture to determine the motion vector for the respective sub-block. In this example, video decoder 30 may combine a horizontal component and a vertical component of the motion vector for the reference picture for the respective sub-block with a horizontal component and vertical component, respectively, of the respective motion vector difference (MvDSearch) for the respective sub-block that is in a bitstream output by source device 12 to determine the motion vector for the respective sub-block.

Similarly, video encoder 20 may, for each respective sub-block of the plurality of sub-blocks, determine, based on a coding block for the respective sub-block, a motion vector for the respective sub-block that corresponds to a motion vector for a reference picture for the respective sub-block. More specifically, for example, video encoder 20 may, for each respective sub-block of the plurality of sub-blocks, select the reference picture such that decoding the sub-block using a motion vector for the selected reference picture results in a lowest cost for decoding the sub-block from a resulting predictor block for the sub-block. In this example, video encoder 20 may determine, based on a difference between the coding block for the respective sub-block and the motion vector of the respective sub-block, a respective motion vector difference for the respective sub-block. For instance, video encoder 20 may generate a respective motion vector difference (e.g., MvDSearch) that includes a horizontal component and a vertical component that are differences between horizontal components and vertical components, respectively, of a motion vector for the reference picture and a motion vector for the respective sub-block and a vertical component. In this example, video encoder 20 may signal the respective motion vector difference (e.g., MvDSearch) for the respective sub-block in a bitstream. In some examples, video encoder 20 may, for each respective sub-block of the plurality of sub-blocks, signal, in a bitstream, a reference picture list indicator (e.g., RefPicListSearch) for the respective sub-block and a reference index (e.g., RefIdxSearch) for the respective sub-block.

The prediction direction of the uni-directional motion compensation may be used to derive RefPicListSearch because the search reference picture list of the signaled motion vector is the same as RefPicListSearch. Thus, the other reference picture list may be RefPicListPred. RefIdxSearch and RefIdxPred may be decoded. The decoder may use the reference picture determined by RefPicListPred and RefIdxPred to predict the motion prediction in Sub-PU level. An example of deriving the motion vector of RefPicListPred in the Sub-PU level is described in the following exemplary embodiments. The predicted image block and the other block given from the signaled motion vector on RefPicListSearch and RefIdxSearch may be combined to generate the final inter prediction.

Examples are discussed in the following. Sub-PU based motion vector prediction on RefPicListPred in decoder is discussed in the following.

As an example, the motion vector prediction of RefPicListPred may be generated in a sub-PU (4×4) level. A Sub-PU motion vector prediction may be the combination of upper, left and lower right motion vectors which are all scaled to a specific RefIdxPred. Said differently, video decoder 30 may, for each respective sub-block of the plurality of sub-blocks, derive a respective motion vector of the respective sub-block based on motion information for at least two blocks neighboring the respective sub-block. Similarly, video encoder 20 may, for each respective sub-block of the plurality of sub-blocks, derive a respective first motion vector of the respective sub-block based on motion information for at least two blocks neighboring the respective sub-block.

Figure 11:
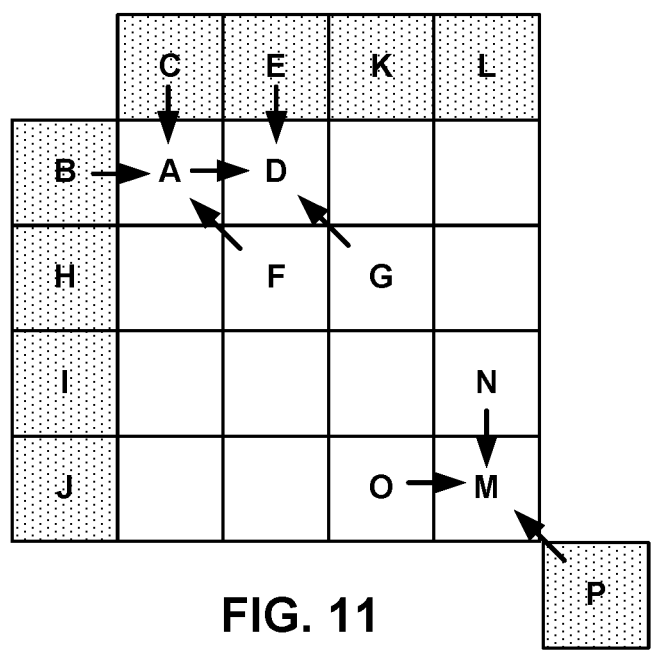
FIG. 11 illustrates an example of predicting Sub-PU motion vectors and its neighboring blocks.

An example is shown in FIG. 11. Assume the PU to be predicted is a 16×16 (greyed) block, which is consisted of 16 4×4 Sub-PUs. The motion vector of Sub-PU A can be computed by:

$$MV^A = (MV_x^A, MV_y^A) = (w_{left}MV^B + w_{up}MV^C + w_{col}MV^F),$$

In the above equation, $w_{left}$, $w_{up}$, and $w_{col}$ are positive weights of neighboring motion vectors with $w_{left} + w_{up} + w_{col} = 1$.

Said differently, for example, video decoder 30 may determine the motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block. Similarly, for example, video encoder 20 may determine the motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block.

In some examples, $w_{left} = w_{up} = w_{col} = 1/3$. Said differently, for example, video decoder 30 may determine a horizontal component of the first motion vector as a sum of a horizontal component of the motion vector of the above neighbor block for the particular sub-block multiplied by a one-third weight, a horizontal component of the motion vector of the left neighbor block for the particular sub-block multiplied by the one-third weight, and a horizontal component of the scaled motion vector multiplied by the one-third weight. In this example, video decoder 30 may determine a vertical component of the first motion vector as a sum of a vertical component of the motion vector of the above neighbor block for the particular sub-block multiplied by the one-third weight, a vertical component of the motion vector of the left neighbor block for the particular sub-block multiplied by the one-third weight, and a vertical component of the scaled motion vector multiplied by the one-third weight.

Similarly, for example, video encoder 20 may determine a horizontal component of the first motion vector as a sum of a horizontal component of the motion vector of the above neighbor block for the particular sub-block multiplied by a one-third weight, a horizontal component of the motion vector of the left neighbor block for the particular sub-block multiplied by the one-third weight, and a horizontal component of the scaled motion vector multiplied by the one-third weight. In this example, video encoder 20 may determine a vertical component of the first motion vector as a sum of a vertical component of the motion vector of the above neighbor block for the particular sub-block multiplied by the one-third weight, a vertical component of the motion vector of the left neighbor block for the particular sub-block multiplied by the one-third weight, and a vertical component of the scaled motion vector multiplied by the one-third weight.

Similarly, the motion vector of Sub-PU D may be the combination of motion vectors of E, A and G. Note that the motion vector from the lower right neighbor may not available for the current PU. Thus, a collocated motion vector, namely the motion vector at the same Sub-PU location from the reference frame, is used. Said differently, for example, video decoder 30 may obtain, from the bitstream, one or more syntax elements specifying a reference index (e.g., RefIdxPred) for the reference picture collocated with the below-right neighbor block for the particular sub-block. More specifically, for example, video decoder 30 may determine the respective reference picture list (e.g., RefPicListPred) for the respective-sub-block as different from the prediction direction used. For instance, video decoder 30 may determine the respective reference picture list (e.g., RefPicListPred) for the respective-sub-block as reference list '1' (e.g., "RefPicList1") when video encoder 20 signals RefPicListSearch in the bitstream as reference list '0' (e.g., "RefPicList0") and may determine the respective reference picture list (e.g., RefPicListPred) for the respective-sub-block as reference list '0' (e.g., "RefPicList0") when video encoder 20 signals RefPicListSearch in the bitstream as reference list '1' (e.g., "RefPicList1"). In this example, video decoder 30 may determine the reference picture based on the reference index (e.g., RefIdxPred). For instance, video decoder 30 may determine the reference picture at the reference index (e.g., RefIdxPred) in the respective reference picture list (e.g., RefPicListPred) for the respective-sub-block.

Similarly, video encoder 20 may signal, in a bitstream, one or more syntax elements specifying a reference index (e.g., RefIdxPred) for the reference picture collocated with the below-right neighbor block for the particular sub-block. More specifically, for example, video encoder 20 may determine the respective reference picture list (e.g., RefPicListPred) for the respective-sub-block as different from the prediction direction used. In some example, video encoder 20 may determine a transmission cost for each reference picture of the reference picture list (e.g., RefPicListPred) for the respective-sub-block. In this example, video encoder 20 may select the reference picture of the picture list (e.g., RefPicListPred) for the respective-sub-block with the lowest transmission cost. In some examples, video encoder 20 may select the reference picture of the picture list (e.g., RefPicListPred) for the respective-sub-block differently. In any case, video encoder 20 may signal a reference index e.g., RefIdxPred) for the reference picture that indicates a position of the selected reference picture in the picture list (e.g., RefPicListPred) for the respective-sub-block.

Video decoder 30 may generate, based on a derived motion vector of the respective sub-block and a searched motion vector of the respective sub-block, a predictive block for the respective sub-block. For example, video decoder 30 may determine, based on the derived motion vector of the respective sub-block, a first array of samples. For instance, video decoder 30 may generate the first array of samples by applying an offset indicated by the derived motion vector of the respective sub-block to a reference picture for the derived motion vector of the respective sub-block. In this example, video decoder 30 may determine, based on samples at a location in the reference picture for the respective sub-block indicated by the searched motion vector for the respective sub-block, a second array of samples. For instance, video decoder 30 may generate the second array of samples by applying an offset indicated by the searched motion vector of the respective sub-block to a reference picture for the searched motion vector of the respective sub-block. In this example, video decoder 30 may generate, based on the first array of samples and the second array of samples, the predictive block for the respective sub-block. For instance, video decoder 30 may generate the predictive block to be an average of the first array of samples and the second array of samples.

Video decoder 30 may combine predictive blocks for the sub-blocks to form a predictive block for the block. A predictive block for a coding unit may include the predictive block for the block. In this example, video decoder 30 may determine residual data for the coding unit. In this example, video decoder 30 may reconstruct a coding block of the coding unit by summing corresponding samples of the residual data and the predictive block for the coding unit.

Similarly, video encoder 20 may generate, based on a derived motion vector of the respective sub-block and a searched motion vector of the respective sub-block, a predictive block for the respective sub-block. For example, video encoder 20 may determine, based on the derived motion vector of the respective sub-block, a first array of samples. For instance, video encoder 20 may generate the first array of samples by applying an offset indicated by the derived motion vector of the respective sub-block to a reference picture for the derived motion vector of the respective sub-block. In this example, video encoder 20 may determine, based on samples at a location in the reference picture for the respective sub-block indicated by the searched motion vector for the respective sub-block, a second array of samples. For instance, video encoder 20 may generate the second array of samples by applying an offset indicated by the searched motion vector of the respective sub-block to a reference picture for the searched motion vector of the respective sub-block. In this example, video encoder 20 may generate, based on the first array of samples and the second array of samples, the predictive block for the respective sub-block. For instance, video encoder 20 may generate the predictive block to be an average of the first array of samples and the second array of samples.

Video encoder 20 may combine predictive blocks for the sub-blocks to form a predictive block for the block. A predictive block for a coding unit may include the predictive block for the block. In this example, video encoder 20 may determine residual data for the coding unit such that the residual data indicates differences between a coding block of the coding unit and the predictive block for the coding unit. In this example, video encoder 20 may partition the residual data for the coding unit into one or more transform blocks. In this example, video encoder 20 may apply a transform to the one or more transform blocks to generate one or more coefficient blocks. In this example, video encoder 20 may quantize coefficients in the one or more coefficient blocks.

As illustrated in FIG. 11, when predicting the motion vector of sub-PU A, the collocated motion vector at F may be found and scaled to current RefIdx, using the TMVP techniques in HEVC described above.

There is possibility that the direct adjacent motion vectors may not be available, motion vector searching may be applied just as in Wei-Jung Chien, Xianglin Wang, Li Zhang, Hongbin Liu, Jianle Chen, Marta Karczewicz, "Sub-PU motion vector prediction using spatial-temporal motion information," U.S. Publication Number 2016/0366435 (U.S. application Ser. No. 15/176,790). The motion vector from left neighbors may be searched vertically, and the motion vector prediction from upper neighbors may be searched horizontally. For example, if $MV^B$ is not available while predicting $MV^A$, then the search order may be B->H->A->I-<J. If the neighboring motion vector prediction is not available, then the weight corresponding to this neighbor may be set to zero. If all the neighboring motion vectors are unavailable, zero motion may be used.

When some of the neighboring motion vectors are bi-directional and others are uni-directional, the weight in different RefPicList may be different. For example, if $MV^B$ and $MV^F$ are bi-directional, but $MV^C$ is uni-directional in RefPicList0, then $w_{up}$=0 in RefPicList0 but $w_{up}$>0 in RefPicList1.

Note, even if the reference picture in the neighboring motion vectors may be different, they may all be scaled to the same reference picture given by current PU RefListPred.

Example of finding MvSearch in the encoder are discussed in the following. For a PU, let the corresponding predicted motion field be MvPred=MV(RefPicListPred, RefIdxPred) that may include multiple Sub-PU level motion vectors. The motion vector found by uni-directional motion compensation of RefPicListSearch and RefIdxSearch may be used as the search start point in bi-directional motion compensation for RefPicListSearch.

One or more techniques described herein, may check each reference pictures in the RefPicListSearch and a minimum cost configuration may be used as the final result (best mode).

Moreover, regular motion vector prediction may also be applied to MvSearch. The difference between the predicted MvSearch and the true MvSearch, denotes by MvDSearch, may need to be transmitted to the decoder if the proposed mode is the best mode among others.

One or more techniques described herein may only transmit MvDSearch, RefPicListSearch, RefIdxSearch and RefIdxPred.

Figure 12B:
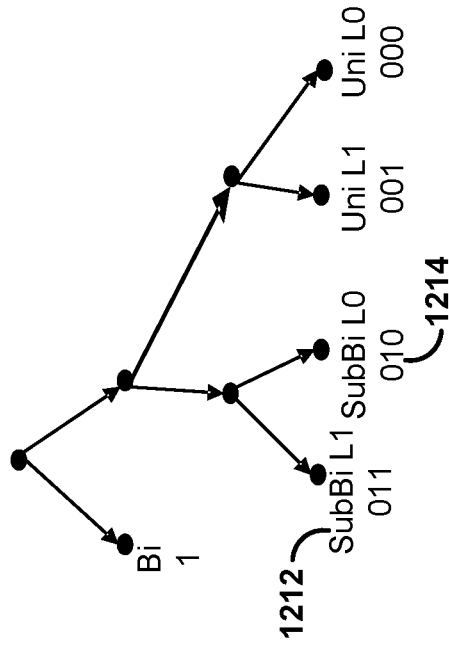
FIG. 12B illustrates a second SubBi signaling.
Figure 12A:
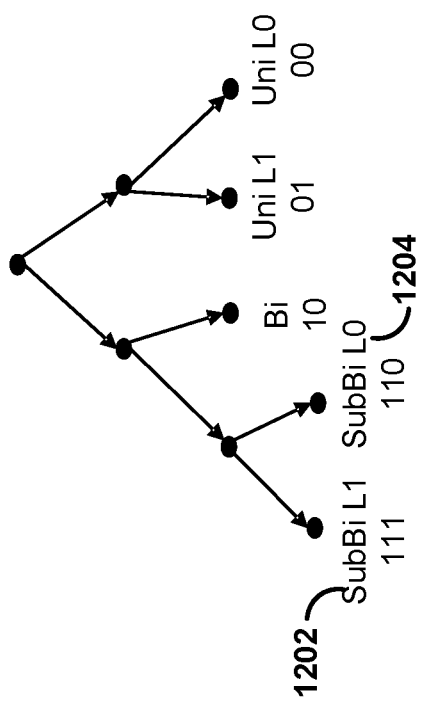
FIG. 12A illustrates a first SubBi signaling.

Signaling is discussed in the following. The signaling of SubBi may be similar to uni-directional motion compensation because only one motion vector is transmitted. The difference is that if sub-PU based bi-directional motion compensation has the lowest cost comparing to the other inter prediction method, a PU level flag, interSubBiFlag may be set and signaled together with the BestList and BestRefIdx. Motion vector difference (MVD) of BestMv will also be signaled. Two examples of signaling scheme are shown in FIGS. 12A-12B. Scheme A of FIG. 12A is more balanced.

In the example of FIG. 12A, video decoder 30 may obtain, from the bitstream, a block level flag and a sub-block flag. In this example, the block level flag has a value of '1' indicating bi-prediction mode and sub-block-bi-prediction mode and the sub-block flag has a value of '1' indicating the sub-block-bi-prediction mode. As shown in FIG. 12A, the block level flag and a sub-block flag of '11' corresponds to SubBi L1 1202 having a value of '111' and SubBi L0 1204 having a value of '110', SubBi L1 1202 and SubBi L0 1204 identify different combinations of reference pictures. For example, SubBi L1 1202 may indicate that the derived motion vector uses a reference picture from reference list '0' (e.g., "RefPicList0") and SubBi L0 1204 may indicate that the derived motion vector uses a reference picture from reference list '1'(e.g., "RefPicList0"). In another example, SubBi L0 1204 may indicate that the derived motion vector uses a reference picture from reference list '0' (e.g., "RefPicList0") and. SubBi L1 1202 may indicate that the derived motion vector uses a reference picture from reference list '1' (e.g., RefPicList0). In any case, video decoder 30 may derive the respective first motion vector and determine the second motion vector in response to determining that the block level flag has a value of '1' and the sub-block flag has a value of '1'. For example, video decoder 30 may perform bi-prediction mode in response to determining that the block level flag has a value of '1' and the sub-block flag has a value of '0.' In another example, video decoder 30 may perform uni-prediction mode in response to determining that the block level flag has a value of '0.'

Similarly, video encoder 20 may signal, in a bitstream, a block level flag having a value of '1' and a sub-block flag having a value of '1' in response to determining that a sub-block-bi-prediction mode has a lower transmission cost than a bi-prediction mode and a uni-prediction mode. Video encoder 20 may derive the respective first motion vector and determine the second motion vector in response to a sub-block-bi-prediction mode having a lower transmission cost than a bi-prediction mode and a uni-prediction mode.

In the example of FIG. 12B, video decoder 30 may obtain, from the bitstream, block level flag and a sub-block flag. In this example, the block level flag has a value of '0' indicating uni-prediction mode and sub-block-bi-prediction mode and the sub-block flag has a value of '1' indicating the sub-block-bi-prediction mode. As shown in FIG. 12B, the block level flag and a sub-block flag of '01' corresponds to SubBi L1 1212 having a value of '011' and SubBi L0 1214 having a value of '010'. SubBi L1 1212 and SubBi L0 1214 may identify different combinations of reference pictures. For example, SubBi L1 1212 may indicate that the derived motion vector uses a reference picture from reference list '0' (e.g., "RefPicList0") and SubBi L0 1214 may indicate that the derived motion vector uses a reference picture from reference list '1'(e.g., "RefPicList0"). In another example, SubBi L0 1214 may indicate that the derived motion vector uses a reference picture from reference list '0' (e.g., "RefPicList0") and. SubBi L1 1212 may indicate that the derived motion vector uses a reference picture from reference list "RefPicList0"). In any case, video decoder 30 may derive the respective first motion vector and determine the second motion vector in response to determining that the block level flag has a value of '0' and the sub-block flag has a value of '1'. For example, video decoder 30 may perform bi-prediction mode in response to determining that the block level flag has a value of '1.' In another example, video decoder 30 may perform uni-prediction mode in response to determining that the block level flag has a value of '0' and the sub-block flag has a value of '0'.

Similarly, video encoder 20 may signal, in a bitstream, a block level flag having a value of '0' and a sub-block flag having a value of '1' in response to determining that a sub-block-bi-prediction mode has a lower transmission cost than a bi-prediction mode and a uni-prediction mode. Video encoder 20 may derive the respective first motion vector and determine the second motion vector in response to a sub-block-bi-prediction mode having a lower transmission cost than a bi-prediction mode and a uni-prediction mode.

Figure 13:
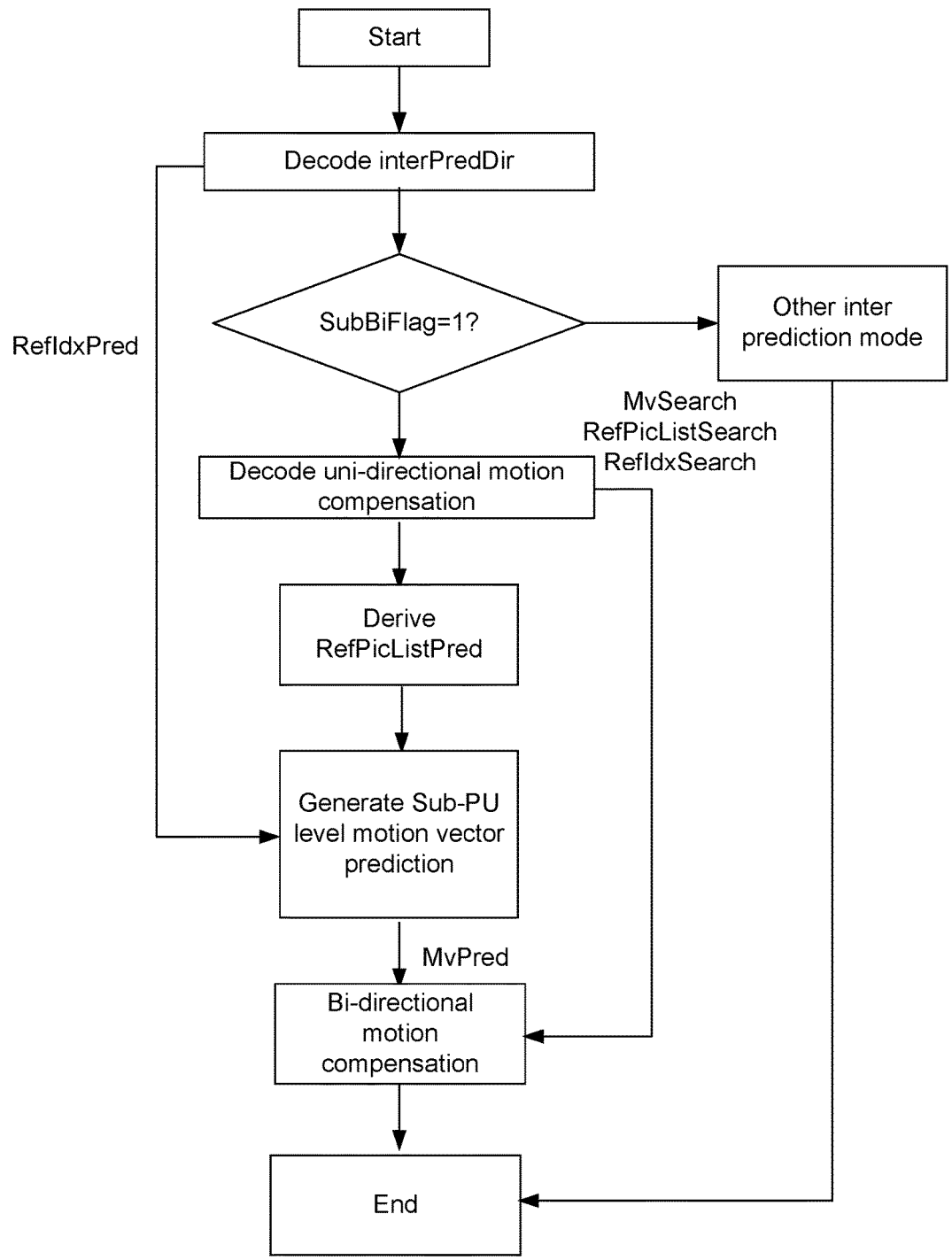
FIG. 13 is a flowchart illustrating a sub-PU bi-directional motion compensation decoder flowchart.

Implementation on HM 16.6-KTA2 is discussed in the following. Decoder on HM 16.6-KTA2 is discussed in the following. The decoder will decode the prediction mode first based on the signaling scheme A. As shown in FIG. 13, if the SubBiFlag is 1, uni-directional motion MC decoding may be used to get MvSearch, RefPicListSearch and RefIdxSearch. Moreover. RefIdxPred may also be decoded. Then RefPicListPred=1−RefPicListSearch. Based on RefPicListPred and RefIdxPred, sub-PU level motion vector prediction may be applied as described above with respect to sub-pu based motion vector prediction on RefPicListPred in a decoder. The inter prediction from MvSearch and the prediction from motion field MvPred may be combined to generate a final motion compensation prediction for current PU.

Figure 14:
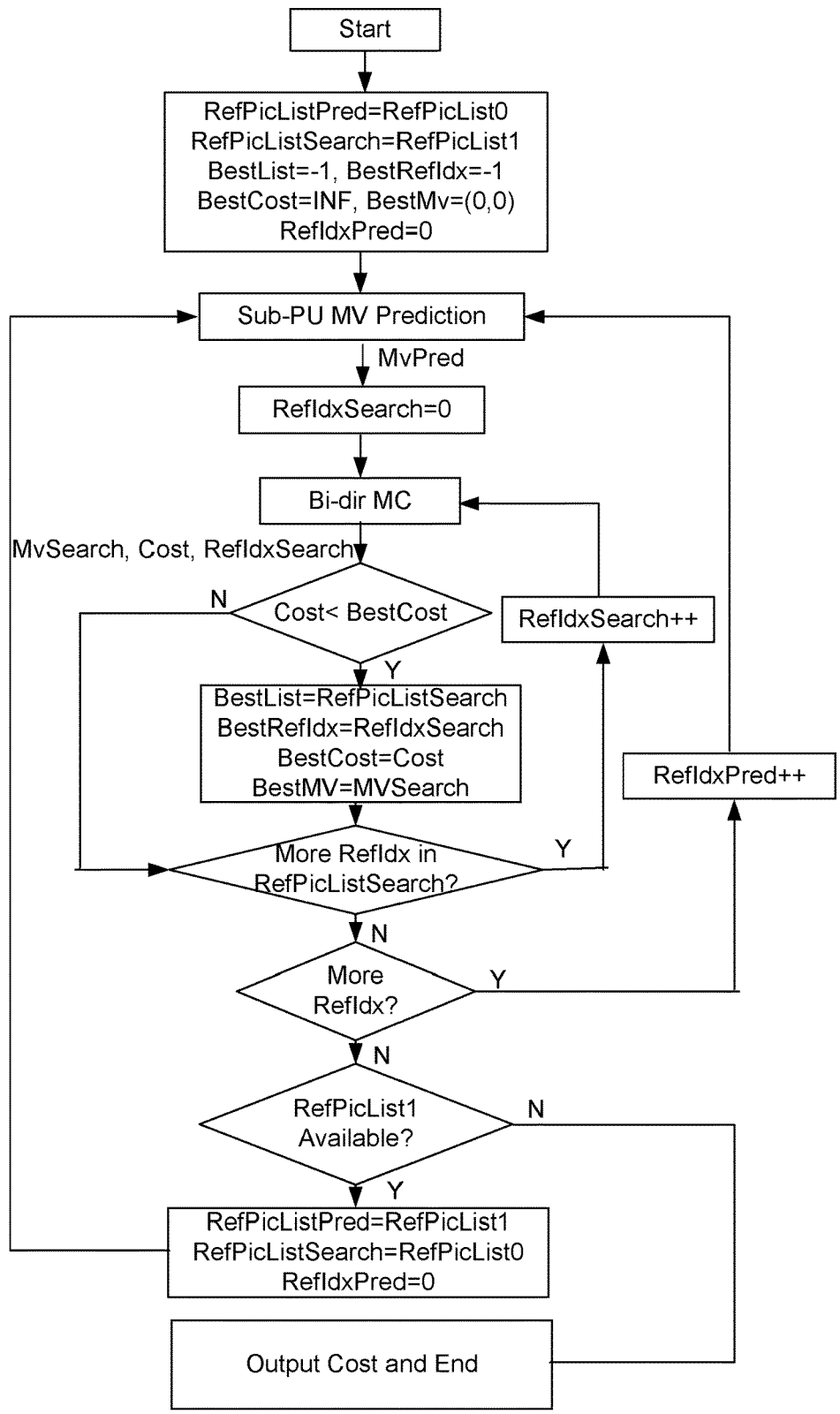
FIG. 14 is a flowchart illustrating a sub-PU bi-directional motion compensation encoder flowchart.

Encoder on HM 16.6-KTA2 is discussed in the following. An example of implementation is shown in FIG. 14. The encoder may check each reference picture list and reference index and the minimum cost configuration will be used as the final result (best mode), At the initialization part, MvPred may be predicted from RefPicList0 and RefIdx=0. The uni-directional prediction on RefPicList1 and RefIdx=0 may be used as the starting point for bi-directional motion estimation. The bi-directional motion estimation cost may be compared to the best cost and the best RefPicListSearch, RefIdxSearch and MvSearch are stored. Each RefIdx in RefPicList0 and RefPicList1 may be tested. Then swap the RefPicListPred and RefPicListSearch. And the same search strategy may be applied.

Simplifications and alternatives is discussed in the following. In a sub-PU bi-directional motion compensation, each reference pic list and reference index may be searched. Therefore, a complexity may be very high. Assume there are M reference picture in list 0 and N reference picture in list 1, there may be a total of 2×M×N bi-directional motion compensation. Moreover, if the combination of non-square PU are considered in a CU, then for each combination of prediction approach (Uni, Bi, SubBi, ATMVP), SubBi may be applied.

To simplify the issue above, an example is to use a sum of absolute transformed differences (SAID), instead of using full rate distortion, for each SubBi search.

As an alternative example, if the PU is non-squared, no delay combination may be computed. For example, when the CU is partitioned as 2N×N, then the best inter-prediction mode of PU0 will be determined first. Then, based on the reconstruction of PU0, the best inter-prediction mode of PU1 may be decided.

As another example, to further reduce a complexity and also reduce the bit rate, MvdL1ZeroFlag in HM 16.6-KTA 2 may be checked. If this flag is 1, the motion vector difference in reference list 1 may always be (0, 0). In this case, only reference pic list 1 will be searched and the motion vector difference of MvSearch may not be signaled.

Figure 15:
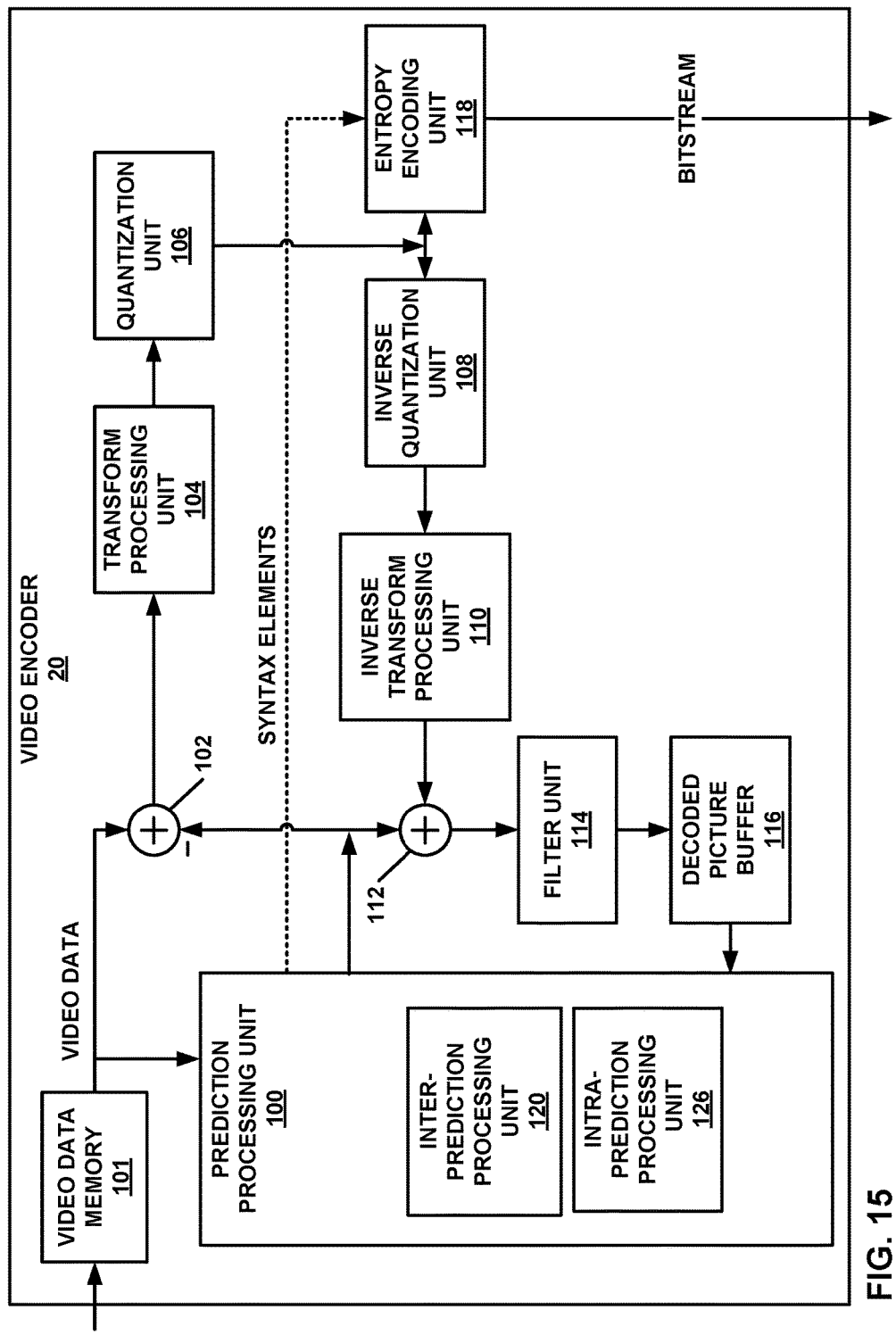
FIG. 15 is a block diagram illustrating an example video encoder that may implement one or more techniques described in this disclosure.

FIG. 15 is a block diagram illustrating an example video encoder 20 that may implement the techniques of this disclosure. FIG. 15 is provided for purposes of explanation and should not be considered limiting of the techniques as broadly exemplified and described in this disclosure. The techniques of this disclosure may be applicable to various coding standards or methods.

In the example of FIG. 15, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure, Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

In accordance with various techniques of this disclosure, prediction processing unit 100 may perform one or more techniques for sub-PU based bi-directional motion compensation.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data, Video encoder 20 may output a bitstream that includes entropy-encoded data generated by entropy encoding unit 118. For instance, the bitstream may include data that represents values of transform coefficients for a CU.

Figure 16:
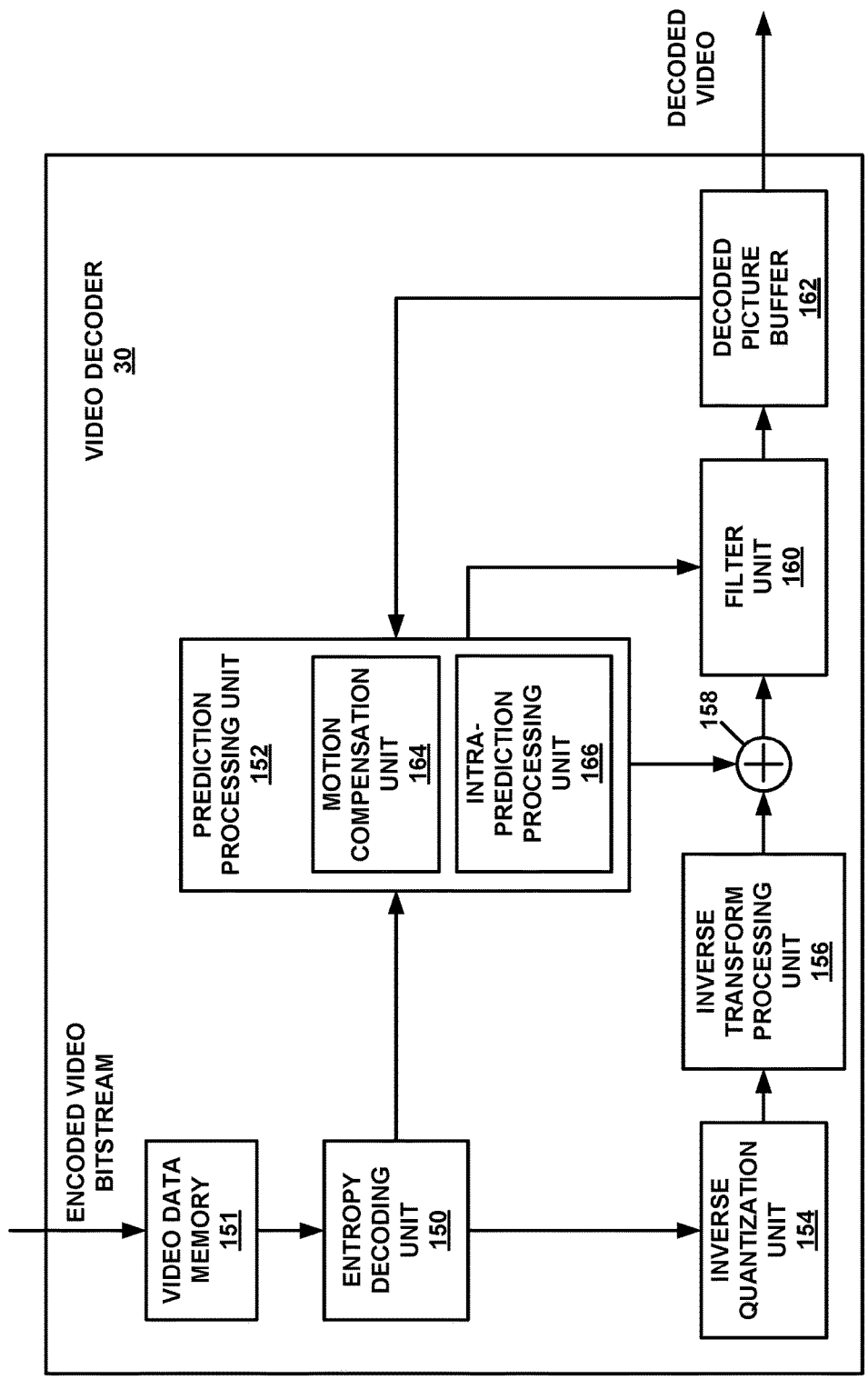
FIG. 16 is a block diagram illustrating an example video decoder may implement one or more techniques described in this disclosure.

FIG. 16 is a block diagram illustrating an example video decoder 30 that is configured to implement the techniques of this disclosure. FIG. 16 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 16, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

In accordance with techniques of this disclosure, prediction processing unit 150 may perform one or more techniques for sub-PU based bi-directional motion compensation.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 17:
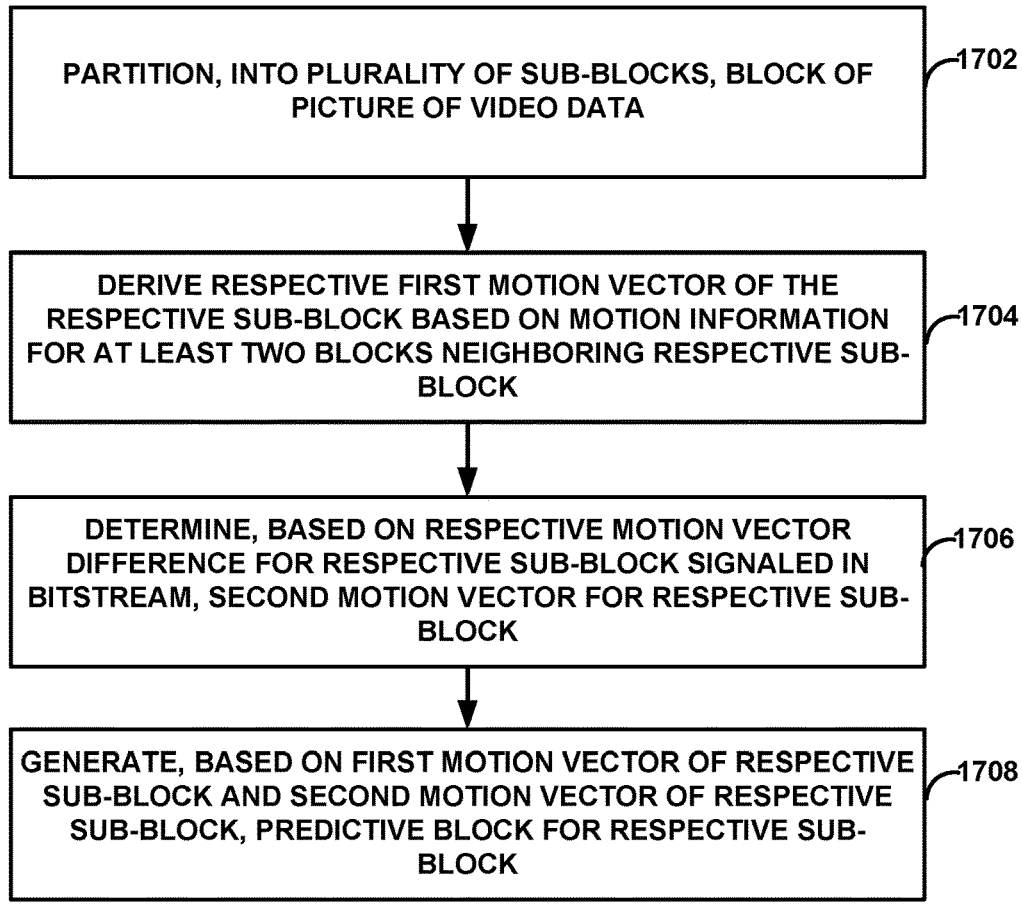
FIG. 17 is a flow diagram illustrating an example decoding of video data that may implement one or more techniques described in this disclosure.

FIG. 17 is a flow diagram illustrating an example decoding of video data that may implement one or more techniques described in this disclosure. As described, the example techniques of FIG. 17 may be performed by video decoder 30. In the example of FIG. 17, a video decoder (e.g., video decoder 30) partitions, into a plurality of sub-blocks, a block of a picture of the video data (1702). The video decoder derives, for each respective sub-block of the plurality of sub-blocks, a respective first motion vector of the respective sub-block based on motion information for at least two blocks neighboring the respective sub-block (1704). For example, video decoder 30 may determine the first motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block.

The video decoder determines, for each respective sub-block of the plurality of sub-blocks, based on a respective motion vector difference for the respective sub-block signaled in a bitstream, a second motion vector for the respective sub-block (1706). For example, video decoder 30 may, for each respective sub-block of the plurality of sub-blocks, obtain, from a bitstream signaled by source device 12, a reference picture list indicator (e.g., RefPicListSearch) for the respective sub-block and a reference index (e.g., RefIdxSearch) for the respective sub-block. In this example, video decoder 30 may combine a horizontal component and a vertical component of the motion vector for a reference picture positioned at reference index (e.g., RefIdxSearch) in the reference picture list indicator (e.g., RefPicListSearch) with a horizontal component and vertical component, respectively, of the respective motion vector difference (MvDSearch) for the respective sub-block that is in a bitstream output by source device 12 to determine the second motion vector for the respective sub-block.

The video decoder generates, based on the first motion vector of the respective sub-block and the second motion vector of the respective sub-block, a predictive block for the respective sub-block (1708). For example, video decoder 30 may generate a first array of samples by applying an offset indicated by the first motion vector of the respective sub-block to a reference picture for the first motion vector of the respective sub-block. In this example, video decoder 30 may generate a second array of samples by applying an offset indicated by the searched motion vector of the respective sub-block to a reference picture for the searched motion vector of the respective sub-block. In this example, video decoder 30 may generate the predictive block such that each sample in the predictive block is an average of corresponding samples in the first array of samples and the second array of samples.

Figure 18:
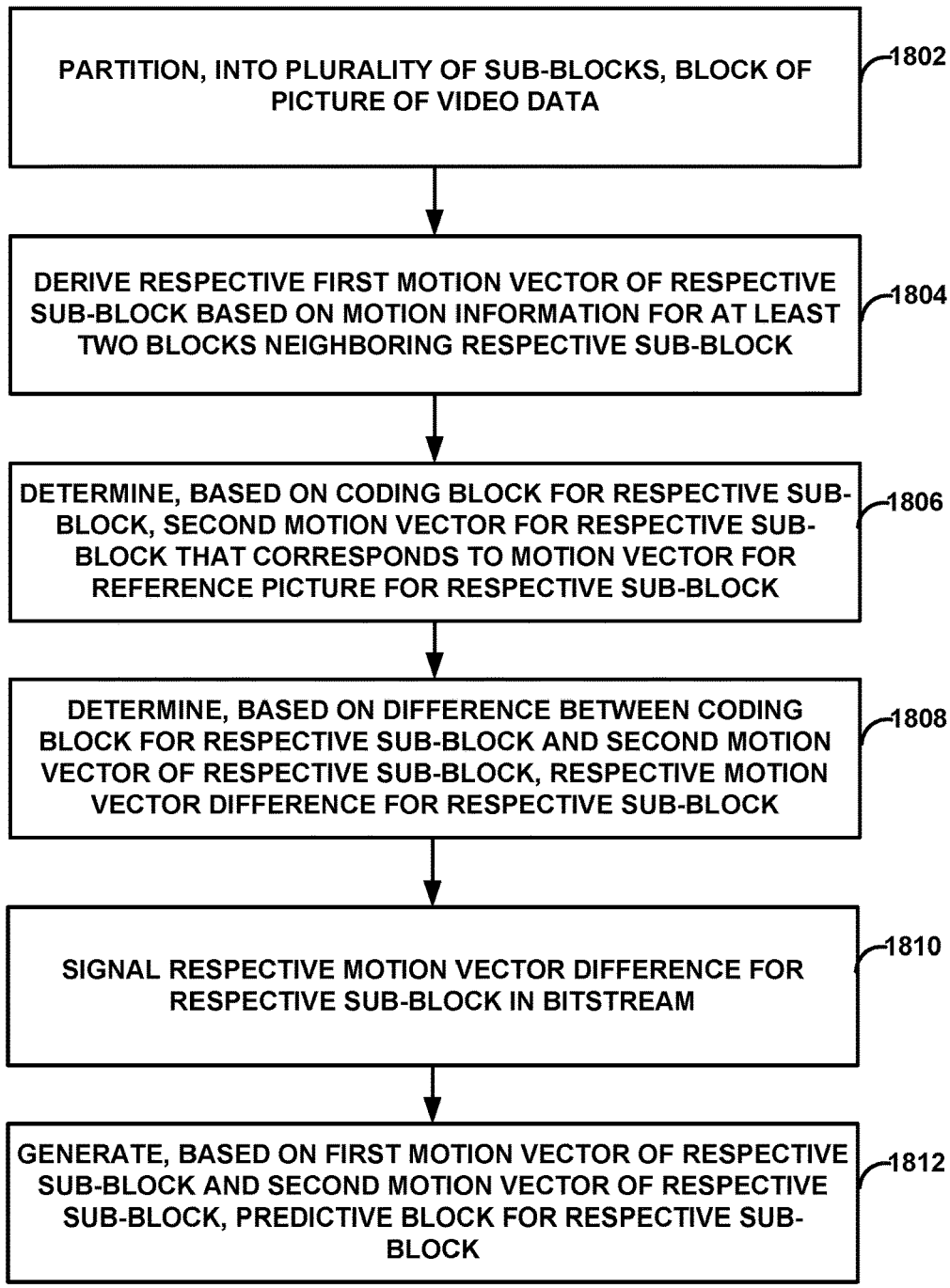
FIG. 18 is a flow diagram illustrating an example encoding of video data that may implement one or more techniques described in this disclosure.

FIG. 18 is a flow diagram illustrating an example encoding of video data that may implement one or more techniques described in this disclosure. As described, the example techniques of FIG. 18 may be performed by video encoder 20. In the example of FIG. 18, a video encoder (e.g., video encoder 20) partitions, into a plurality of sub-blocks, a block of a picture of the video data (1802).

The video encoder derives, for each respective sub-block of the plurality of sub-blocks, a respective first motion vector of the respective sub-block based on motion information for at least two blocks neighboring the respective sub-block (1804). For example, video encoder 20 may determine the motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block.

The video encoder determines, for each respective sub-block of the plurality of sub-blocks, based on a coding block for the respective sub-block, a second motion vector for the respective sub-block that corresponds to a motion vector for a reference picture for the respective sub-block (1806). For example, video encoder 20 may, for each respective sub-block of the plurality of sub-blocks, select the reference picture such that decoding the sub-block using a motion vector for the selected reference picture results in a lowest cost for decoding the sub-block from a resulting predictor block for the sub-block.

The video encoder determines, for each respective sub-block of the plurality of sub-blocks, based on a difference between the coding block for the respective sub-block and the second motion vector of the respective sub-block, a respective motion vector difference for the respective sub-block (1808). For example, video encoder 20 may generate a respective motion vector difference (e.g., MvDSearch) that includes a horizontal component and a vertical component that are differences between horizontal components and vertical components, respectively, of a motion vector for the reference picture and a motion vector for the respective sub-block and a vertical component.

The video encoder signals, for each respective sub-block of the plurality of sub-blocks, the respective motion vector difference for the respective sub-block in a bitstream (1810). For example, video encoder 20 may signal the respective motion vector difference (e.g., MvDSearch) for the respective sub-block in a bitstream. Although not illustrated in FIG. 18, in some examples, video encoder 20 may signal, for each respective sub-block of the plurality of sub-blocks, in a bitstream, a reference picture list indicator (e.g., RefPicListSearch) for the respective sub-block and a reference index (e.g., RefIdxSearch) for the respective sub-block.

The video encoder generates, for each respective sub-block of the plurality of sub-blocks, based on the first motion vector of the respective sub-block and the second motion vector of the respective sub-block, a predictive block for the respective sub-block (1812). For example, video encoder 20 may generate a first array of samples by applying an offset indicated by the first motion vector of the respective sub-block to a reference picture for the first motion vector of the respective sub-block. In this example, video encoder 20 may generate a second array of samples by applying an offset indicated by the second motion vector of the respective sub-block to a reference picture for the second motion vector of the respective sub-block. In this example, video encoder 20 may generate the predictive block such that each sample in the predictive block is an average of corresponding samples in the first array of samples and the second array of samples.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software. the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    partitioning, into a plurality of sub-blocks, a block of a picture of the video data; and
    for each respective sub-block of the plurality of sub-blocks:
        deriving a respective first motion vector of the respective sub-block based on motion information for at least two blocks neighboring the respective sub-block, wherein, for a particular sub-block of the plurality of sub-blocks, deriving the respective first motion vector of the particular sub-block comprises determining the respective first motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block;
        determining, based on a respective motion vector difference for the respective sub-block signaled in a bitstream, a second motion vector for the respective sub-block; and
        generating, based on the first motion vector of the respective sub-block and the second motion vector of the respective sub-block, a predictive block for the respective sub-block.

2. The method of claim 1, wherein determining the first motion vector of the particular sub-block comprises:
    determining a horizontal component of the first motion vector as a sum of a horizontal component of the motion vector of the above neighbor block for the particular sub-block multiplied by a one-third weight, a horizontal component of the motion vector of the left neighbor block for the particular sub-block multiplied by the one-third weight, and a horizontal component of the scaled motion vector multiplied by the one-third weight; and
    determining a vertical component of the first motion vector as a sum of a vertical component of the motion vector of the above neighbor block for the particular sub-block multiplied by the one-third weight, a vertical component of the motion vector of the left neighbor block for the particular sub-block multiplied by the one-third weight, and a vertical component of the scaled motion vector multiplied by the one-third weight.

3. The method of claim 1, wherein, for the particular sub-block of the plurality of sub-blocks, the method further comprises:
    obtaining, from the bitstream, one or more syntax elements specifying a reference index for the reference picture collocated with the below-right neighbor block for the particular sub-block; and
    determining the reference picture based on the reference index.

4. The method of claim 1, wherein, for each respective sub-block of the plurality of sub-blocks, the method further comprises:
    obtaining, from the bitstream, a reference picture list indicator for the respective sub-block and a reference index for the respective sub-block,
    the reference picture list indicator for the respective sub-block indicating a respective reference picture list for the respective-sub-block,
    the reference index for the respective sub-block indicating a reference picture for the respective sub-block in the reference picture list for the respective sub-block; and
    generating the predictive block for the respective sub-block comprises:
        determining, based on the first motion vector of the respective sub-block, a first array of samples;
        determining, based on samples at a location in the reference picture for the respective sub-block indicated by the second motion vector for the respective sub-block, a second array of samples; and
        generating, based on the first array of samples and the second array of samples, the predictive block for the respective sub-block.

5. The method of claim 1, wherein, for each respective sub-block of the plurality of sub-blocks, the method further comprises:
    obtaining, from the bitstream, a block level flag and a sub-block flag,
    the block level flag having a value of '1' indicating bi-prediction mode and sub-block-bi-prediction mode, and
    the sub-block flag having a value of '1' indicating the sub-block-bi-prediction mode, wherein deriving the respective first motion vector and determining the second motion vector are in response to determining that the block level flag has a value of '1' and the sub-block flag has a value of '1'.

6. The method of claim 1, wherein for each respective sub-block of the plurality of sub-blocks, the method further comprises:
obtaining, from the bitstream, a block level flag and a sub-block flag,
the block level flag having a value of '0' indicating uni-prediction mode and sub-block-bi-prediction mode and,
the sub-block flag having a value of '1' indicating the sub-block-bi-prediction mode,
wherein deriving the respective first motion vector and determining the second motion vector are in response to determining that the block level flag has a value of '0' and the sub-block flag has a value of '1'.

7. The method of claim 1, further comprising:
combining the predictive blocks for the sub-blocks to form a predictive block for the block, wherein a predictive block for a coding unit comprises the predictive block for the block;
determining residual data for the coding unit; and
reconstructing a coding block of the coding unit by summing corresponding samples of the residual data and the predictive block for the coding unit.

8. A method of encoding video data, the method comprising:
partitioning, into a plurality of sub-blocks, a block of a picture of the video data; and
for each respective sub-block of the plurality of sub-blocks:
deriving a respective first motion vector of the respective sub-block based on motion information for at least two blocks neighboring the respective sub-block, wherein, for a particular sub-block of the plurality of sub-blocks, deriving the respective first motion vector of the particular sub-block comprises determining the respective first motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block;
determining, based on a coding block for the respective sub-block, a second motion vector for the respective sub-block that corresponds to a motion vector for a reference picture for the respective sub-block;
determining, based on a difference between the coding block for the respective sub-block and the second motion vector of the respective sub-block, a respective motion vector difference for the respective sub-block;
signaling the respective motion vector difference for the respective sub-block in a bitstream; and
generating, based on the first motion vector of the respective sub-block and the second motion vector of the respective sub-block, a predictive block for the respective sub-block.

9. The method of claim 8, wherein determining the first motion vector of the particular sub-block comprises:
determining a horizontal component of the first motion vector as a sum of a horizontal component of the motion vector of the above neighbor block for the particular sub-block multiplied by a one-third weight, a horizontal component of the motion vector of the left neighbor block for the particular sub-block multiplied by the one-third weight, and a horizontal component of the scaled motion vector multiplied by the one-third weight; and
determining a vertical component of the first motion vector as a sum of a vertical component of the motion vector of the above neighbor block for the particular sub-block multiplied by the one-third weight, a vertical component of the motion vector of the left neighbor block for the particular sub-block multiplied by the one-third weight, and a vertical component of the scaled motion vector multiplied by the one-third weight.

10. The method of claim 8, wherein, for the particular sub-block of the plurality of sub-blocks, the method further comprises:
signaling, in the bitstream, one or more syntax elements specifying a reference index for the reference picture collocated with the below-right neighbor block for the particular sub-block.

11. The method of claim 8, wherein, for each respective sub-block of the plurality of sub-blocks, the method further comprises:
signaling, in the bitstream, a reference picture list indicator for the respective sub-block and a reference index for the respective sub-block,
the reference picture list indicator for the respective sub-block indicating a respective reference picture list for the respective-sub-block,
the reference index for the respective sub-block indicating the reference picture for the respective sub-block in the reference picture list for the respective sub-block; and
generating the predictive block for the respective sub-block comprises:
determining, based on the first motion vector of the respective sub-block, a first array of samples;
determining, based on samples at a location in the reference picture for the respective sub-block indicated by the second motion vector for the respective sub-block, a second array of samples; and
generating, based on the first array of samples and the second array of samples, the predictive block for the respective sub-block.

12. The method of claim 8, wherein for each respective sub-block of the plurality of sub-blocks, the method further comprises:
signaling, in the bitstream, a block level flag having a value of '1' and a sub-block flag having a value of '1' in response to determining that a sub-block-bi-prediction mode has a lower transmission cost than a bi-prediction mode and a uni-prediction mode,
the block level flag having a value of '1' indicating the bi-prediction mode and the sub-block-bi-prediction mode, and
the sub-block flag having a value of '1' indicating the sub-block-bi-prediction mode,
wherein deriving the respective first motion vector and determining the second motion vector are in response to determining that the sub-block-bi-prediction mode has a lower transmission cost than the bi-prediction mode and the uni-prediction mode.

13. The method of claim 8, wherein for each respective sub-block of the plurality of sub-blocks, the method further comprises:

signaling, in the bitstream, a block level flag having a value of '0' and a sub-block flag having a value of '1' in response to determining that a sub-block-bi-prediction mode has a lower transmission cost than a bi-prediction mode and a uni-prediction mode, the block level flag having a value of '0' indicating the uni-prediction mode and the sub -block-bi-prediction mode, and the sub-block flag having a value of '1' indicating the sub-block-bi-prediction mode, wherein deriving the respective first motion vector and determining the second motion vector are in response to determining that the sub-block-bi-prediction mode has a lower transmission cost than the bi-prediction mode and the bi-prediction mode.

14. The method of claim 8, further comprising:

combining the predictive blocks for the sub-blocks to form a predictive block for the block, wherein a predictive block for a coding unit comprises the predictive block for the block;

determining residual data for the coding unit such that the residual data indicates differences between a coding block of the coding unit and the predictive block for the coding unit;

partitioning the residual data for the coding unit into one or more transform blocks;

applying a transform to the one or more transform blocks to generate one or more coefficient blocks; and quantizing coefficients in the one or more coefficient blocks.

15. An apparatus for decoding video data comprising:

one or more storage media configured to store video data; and one or more processors configured to:
  partition, into a plurality of sub-blocks, a block of a picture of the video data; and
  for each respective sub-block of the plurality of sub-blocks:
    derive a respective first motion vector of the respective sub-block based on motion information for at least two blocks neighboring the respective sub-block, wherein, for a particular sub-block of the plurality of sub-blocks, to derive the respective first motion vector of the particular sub-block, the one or more processors are configured to determine the respective first motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block;
    determine, based on a respective motion vector difference for the respective sub-block signaled in a bitstream, a second motion vector for the respective sub-block; and
    generate, based on the first motion vector of the respective sub-block and the second motion vector of the respective sub-block, a predictive block for the respective sub-block.

16. The apparatus of claim 15, wherein, to determine the first motion vector of the particular sub-block, the one or more processors are configured to:

determine a horizontal component of the first motion vector as a sum of a horizontal component of the motion vector of the above neighbor block for the particular sub-block multiplied by a one-third weight, a horizontal component of the motion vector of the left neighbor block for the particular sub-block multiplied by the one-third weight, and a horizontal component of the scaled motion vector multiplied by the one-third weight; and determine a vertical component of the first motion vector as a sum of a vertical component of the motion vector of the above neighbor block for the particular sub-block multiplied by the one-third weight, a vertical component of the motion vector of the left neighbor block for the particular sub-block multiplied by the one-third weight, and a vertical component of the scaled motion vector multiplied by the one-third weight.

17. The apparatus of claim 15, wherein, for the particular sub-block of the plurality of sub-blocks, the one or more processors are further configured to:

obtain, from the bitstream, one or more syntax elements specifying a reference index for the reference picture collocated with the below-right neighbor block for the particular sub-block; and determine the reference picture based on the reference index.

18. The apparatus of claim 15, wherein, for the particular sub-block of the plurality of sub-blocks, the one or more processors are further configured to:

obtain, from the bitstream, a reference picture list indicator for the respective sub-block and a reference index for the respective sub-block, the reference picture list indicator for the respective sub-block indicating a respective reference picture list for the respective-sub-block, the reference index for the respective sub-block indicating a reference picture for the respective sub-block in the reference picture list for the respective sub-block; and wherein to generate the predictive block for the respective sub-block, the one or more processors are configured to:
  determine, based on the first motion vector of the respective sub-block, a first array of samples;
  determine, based on samples at a location in the reference picture for the respective sub-block indicated by the second motion vector for the respective sub-block, a second array of samples; and
  generate, based on the first array of samples and the second array of samples, the predictive block for the respective sub-block.

19. The apparatus of claim 15, wherein, for the particular sub-block of the plurality of sub-blocks, the one or more processors are further configured to:

obtain, from the bitstream, a block level flag and a sub-block flag, the block level flag having a value of '1' indicating bi-prediction mode and sub-block-bi-prediction mode, and the sub-block flag having a value of '1' indicating the sub-block-bi-prediction mode, wherein the one or more processors are configured to derive the respective first motion vector and to determine the second motion vector in response to determining that the block level flag has a value of '1' and the sub-block flag has a value of '1'.

20. The apparatus of claim 15, wherein, for each respective sub-block of the plurality of sub-blocks, the one or more processors are further configured to:

obtain, from the bitstream, a block level flag and a sub-block flag, the block level flag having a value of '0' indicating uni-prediction mode and sub-block-bi-prediction mode and, the sub-block flag having a value of '1' indicating the sub-block-bi-prediction mode, wherein the one or more processors are configured to derive the respective first motion vector and to determine the second motion vector in response to determining that the block level flag has a value of '0' and the sub-block flag has a value of '1'.

21. The apparatus of claim 15, wherein, for each respective sub-block of the plurality of sub-blocks, the one or more processors are further configured to:
combine the predictive blocks for the sub-blocks to form a predictive block for the block, wherein a predictive block for a coding unit comprises the predictive block for the block;
determine residual data for the coding unit; and
reconstruct a coding block of the coding unit by summing corresponding samples of the residual data and the predictive block for the coding unit.

22. The apparatus of claim 15, wherein the apparatus comprises one or more of a camera, a computer, a mobile device, a broadcast receiver device, or a set-top box.

23. The apparatus of claim 15, wherein the device comprises at least one of:
an integrated circuit;
a microprocessor; or
a wireless communication device.

24. An apparatus for encoding video data comprising:
one or more storage media configured to store video data; and
one or more processors configured to:
partition, into a plurality of sub-blocks, a block of a picture of the video data; and
for each respective sub-block of the plurality of sub-blocks:
derive a respective first motion vector of the respective sub-block based on motion information for at least two blocks neighboring the respective sub-block, wherein, for a particular sub-block of the plurality of sub-blocks, to derive the respective first motion vector of the particular sub-block, the one or more processors are configured to determine the respective first motion vector of the particular sub-block as a weighted sum of a motion vector of an above neighbor block for the particular sub-block, a motion vector of a left neighbor block for the particular sub-block, and a scaled motion vector of a motion vector of a block of a reference picture collocated with a below-right neighbor block for the particular sub-block;
determine, based on a coding block for the respective sub-block, a second motion vector for the respective sub-block that corresponds to a motion vector for a reference picture for the respective sub-block;
determine, based on a difference between the coding block for the respective sub-block and the second motion vector of the respective sub-block, a respective motion vector difference for the respective sub-block;
signal the respective motion vector difference for the respective sub-block in a bitstream; and
generate, based on the first motion vector of the respective sub-block and the second motion vector of the respective sub-block, a predictive block for the respective sub-block.

25. The apparatus of claim 24, wherein, to determine the first motion vector of the particular sub-block, the one or more processors are configured to:
determine a horizontal component of the first motion vector as a sum of a horizontal component of the motion vector of the above neighbor block for the particular sub-block multiplied by a one-third weight, a horizontal component of the motion vector of the left neighbor block for the particular sub-block multiplied by the one-third weight, and a horizontal component of the scaled motion vector multiplied by the one-third weight; and
determine a vertical component of the first motion vector as a sum of a vertical component of the motion vector of the above neighbor block for the particular sub-block multiplied by the one-third weight, a vertical component of the motion vector of the left neighbor block for the particular sub-block multiplied by the one-third weight, and a vertical component of the scaled motion vector multiplied by the one-third weight.

26. The apparatus of claim 24, wherein the one or more processors are configured to:
signal, in the bitstream, one or more syntax elements specifying a reference index for the reference picture collocated with the below-right neighbor block for the particular sub-block.

* * * * *